United States Patent
Couleaud et al.

(10) Patent No.: US 11,297,374 B2
(45) Date of Patent: Apr. 5, 2022

(54) TERMINAL EDGE IN-FLIGHT ENTERTAINMENT SYSTEM

(71) Applicant: Thales Avionics, Inc., Irvine, CA (US)

(72) Inventors: Jean-Yves Couleaud, Mission Viejo, CA (US); François Michel, Mérignac (FR)

(73) Assignee: THALES AVIONICS, INC., Irvine, CA (US)

( * ) Notice: Subject to any disclaimer, the term of this patent is extended or adjusted under 35 U.S.C. 154(b) by 137 days.

(21) Appl. No.: 16/894,415

(22) Filed: Jun. 5, 2020

(65) Prior Publication Data

US 2020/0304861 A1    Sep. 24, 2020

Related U.S. Application Data

(60) Division of application No. 16/108,153, filed on Aug. 22, 2018, now Pat. No. 11,039,198, which is a
(Continued)

(51) Int. Cl.
| | |
|---|---|
| H04L 29/08 | (2006.01) |
| H04N 21/47 | (2011.01) |
| H04N 21/214 | (2011.01) |
| H04N 21/426 | (2011.01) |
| H04N 21/431 | (2011.01) |
| H04N 21/433 | (2011.01) |
| H04L 67/1097 | (2022.01) |

(Continued)

(52) U.S. Cl.
CPC ....... *H04N 21/426* (2013.01); *H04L 67/1097* (2013.01); *H04L 67/32* (2013.01); *H04N 21/2146* (2013.01); *H04N 21/431* (2013.01); *H04N 21/433* (2013.01); *H04N 21/47* (2013.01); *H04L 67/12* (2013.01)

(58) Field of Classification Search
None
See application file for complete search history.

(56) References Cited

U.S. PATENT DOCUMENTS

| | | |
|---|---|---|
| 9,226,000 B1 | 12/2015 | Knight |
| 9,967,595 B1 * | 5/2018 | Provost .............. H04N 21/2146 |
| 2005/0129239 A1 | 6/2005 | Farley et al. |
| (Continued) | | |

FOREIGN PATENT DOCUMENTS

| | | |
|---|---|---|
| WO | 03024085 A2 | 3/2003 |
| WO | 2005107262 A1 | 11/2005 |

*Primary Examiner* — Uzma Alam
(74) *Attorney, Agent, or Firm* — Sage Patent Group

(57) ABSTRACT

Courier electronic devices are used to transport seat video display unit (SVDU) operating system (OS) code updates from a content operation center to onboard a vehicle. The OS code used by the SVDUs is updated based on the OS code update to generate an updated OS code, which is used to curate entertainment content files from a mass storage device for selection among by passengers for their consumption through the SVDUs. Entertainment content files may also be selected by the content operation center based on passenger characteristic information and loaded onto the courier electronic devices for transport onboard the vehicle for transfer to the S VDUs to update the entertainment content that is made available for selection by the passengers. The courier electronic devices may be used to facilitate transportation of other information between the SVDUs in the content operation center.

19 Claims, 13 Drawing Sheets

Related U.S. Application Data continuation-in-part of application No. 15/210,648, filed on Jul. 14, 2016, now Pat. No. 10,701,132.

(51) Int. Cl.
    *H04L 67/60*       (2022.01)
    *H04L 67/12*       (2022.01)

(56) References Cited

U.S. PATENT DOCUMENTS

| | | |
|---|---|---|
| 2006/0031748 A1 | 2/2006 | Brady, Jr. et al. |
| 2006/0217875 A1* | 9/2006 | Oesterling .............. G01C 21/00 701/34.4 |
| 2007/0261095 A1* | 11/2007 | Petrisor .............. H04N 7/17318 725/131 |
| 2010/0049626 A1* | 2/2010 | Hong ................. G06Q 30/0601 705/26.1 |
| 2011/0271198 A1* | 11/2011 | Brakensiek ............. H04L 67/14 715/744 |
| 2015/0040113 A1* | 2/2015 | Muench-Casanova ...................... G06F 9/4406 717/168 |
| 2015/0150061 A1 | 5/2015 | Bleacher et al. |
| 2015/0230044 A1* | 8/2015 | Paun ....................... H04L 67/12 455/41.2 |
| 2016/0202966 A1* | 7/2016 | Vangelov ................ H04L 67/12 717/172 |
| 2016/0266886 A1* | 9/2016 | Sarkar ..................... H04L 67/34 |
| 2016/0344792 A1* | 11/2016 | Sinivaara ......... H04N 21/43637 |
| 2017/0026676 A1 | 1/2017 | Watson et al. |
| 2017/0033989 A1* | 2/2017 | Toprani ............... H04L 41/0846 |
| 2017/0353506 A1 | 12/2017 | Warrick et al. |
| 2018/0027036 A1 | 1/2018 | Watson et al. |
| 2018/0027037 A1 | 1/2018 | Watson et al. |
| 2020/0089487 A1* | 3/2020 | Ramic ....................... G06F 8/65 |

\* cited by examiner

TERMINAL EDGE IN-FLIGHT ENTERTAINMENT SYSTEM

CROSS REFERENCE

This application is a divisional application of U.S. patent application Ser. No. 16/108,153, filed on Aug. 22, 2018, which itself is a continuation-in-part of U.S. patent application Ser. No. 15/210,648, filed Jul. 14, 2016, the disclosure and content of which is incorporated by reference herein in its entirety.

FIELD OF THE INVENTION

The present disclosure relates to systems for transferring content between a ground based computer server and an aircraft based or other vehicle based computer content server.

BACKGROUND

In-flight entertainment (IFE) systems have been deployed onboard aircraft to provide entertainment for passengers in a passenger cabin. The in-flight entertainment systems typically provide passengers with, movies, television, and audio entertainment programming.

IFE system software usually follows a relatively very complex and slow development process driven by airplane certification concerns and requirements. Once installed inside an airplane IFE system, the software may remain for years without being refreshed, which has become an impediment to airlines desiring to offer more "up-to-date" IFE system experiences to their passengers and to airlines desiring to test out new IFE system features.

IFE content also follows a slow refresh cycle which can last 60 days or more between when an airline selects new content and when that content is eventually uploaded onboard aircraft IFE systems to become available for passengers' consumption.

Traditionally, IFE systems host a large data storage amount of content to satisfy a variety of passengers. This has resulted in the installation of large capacity data storage device(s) onboard airplanes as part of the IFE systems. In conjunction to the refresh cycles, this has resulted in massive amount of content needing to be transferred to each airplane individually and requiring manual shipment of high capacity hard disk data storage drives from the content integration center to each airline hub. Moreover, refreshing software and entertainment content can require airplane downtime during the loading process.

For an aircraft equipped with a wireless data communication subsystem, some content files can be uploaded or downloaded through wireless data links during flight or upon arrival at an airport. Wireless ground data links can be installed at airports but the cost of deployment and maintenance can be prohibitively expensive. For these and other reasons many airports around the world do not have wireless ground data link systems or have systems that provide insufficient communication bandwidth to enable completion of large content file transfers while an aircraft remains at the airports between flights. Moreover, the per-megabyte usage cost of subscriber-based ground and satellite data links, e.g., licensed cellular/satellite based systems, can be prohibitively expensive to use for many types of large content file transfers.

SUMMARY

Some embodiments of the present disclosure are directed to providing an improved approach for updating operating system code in a seat video display unit. The seat video display unit includes a display device, a radio network transceiver, at least one processor, a mass storage device, and a program memory device. The display device is configured to be mounted to a seat within a vehicle. The mass storage device stores entertainment content files. The program memory device stores operating system code and application code, both of which are executed by the at least one processor to perform operations. The operations include establishing a communication link through the radio network transceiver with a courier electronic device that has been transported onto the vehicle by a passenger, and then discovering presence of an operating system code update that is stored in memory of the courier electronic device based on communications performed through the communication link. Responsive to the discovering, the operations load the operating system code update from the courier electronic device through the communication link and then update the operating system code of the seat video display unit to generate updated operating system code responsive to the operating system code update that was loaded from the courier electronic device. The operations then execute the updated operating system code to curate entertainment content files from the mass storage device for selection among by the passenger and for execution to display content on the display device.

Accordingly, an aircraft operator may use passenger's mobile phones, tablet computers, and other courier electronic devices to transport updates for operating system code within seat video display units. Further embodiments of operations for updating operating system code and entertainment content are disclosed herein.

Some other embodiments of the present disclosure are directed to corresponding operations that can be performed by a content operation center. The content operation center can include at least one network interface, at least one processor, and a program memory device that stores program code which is executed by the at least one processor to perform operations. The network interface is connected to a mass storage device which stores entertainment content files and is connected to a repository passenger profiles. The operations include establishing a communication link with a courier electronic device that is operated by a user and identifying the user. The operations obtain passenger characteristic information based on the identity of the user. The passenger characteristic information identifies a travel itinerary of the user including as a scheduled passenger on an identified vehicle. The operations identify an operating system code update that is to be couriered by the user when traveling as the scheduled passenger to the identified vehicle. The operating system code update is configured to update an operating system code of a seat video display unit which is attached to a seat on the identified vehicle. The operations communicate the operating system code update through the network interface and store on the courier electronic device which is to be transported onto the vehicle by the user for updating of the operating system code of the seat video display unit.

Other seat video display units and content operation centers, and corresponding computer program products and methods according to embodiments of the inventive subject matter will be or become apparent to one with skill in the art upon review of the following drawings and detailed description. It is intended that all such additional seat video display units and content operation centers, and corresponding computer program products and methods be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to innovative ways for transferring content files from a ground based content server to vehicle based content servers using courier electronic devices, such as passengers' mobile phones. Although embodiments herein are primarily described in the context of transferring content files to and/or from an aircraft based content server that is part of an In-flight entertainment (IFE) system deployed onboard on an aircraft, the invention is not limited thereto. Instead, these and other related embodiments may be used to transfer content files to and/or from content servers located in other types of vehicles, including without limitation, trains, automobiles, cruise ships, and buses.

Figure 1:
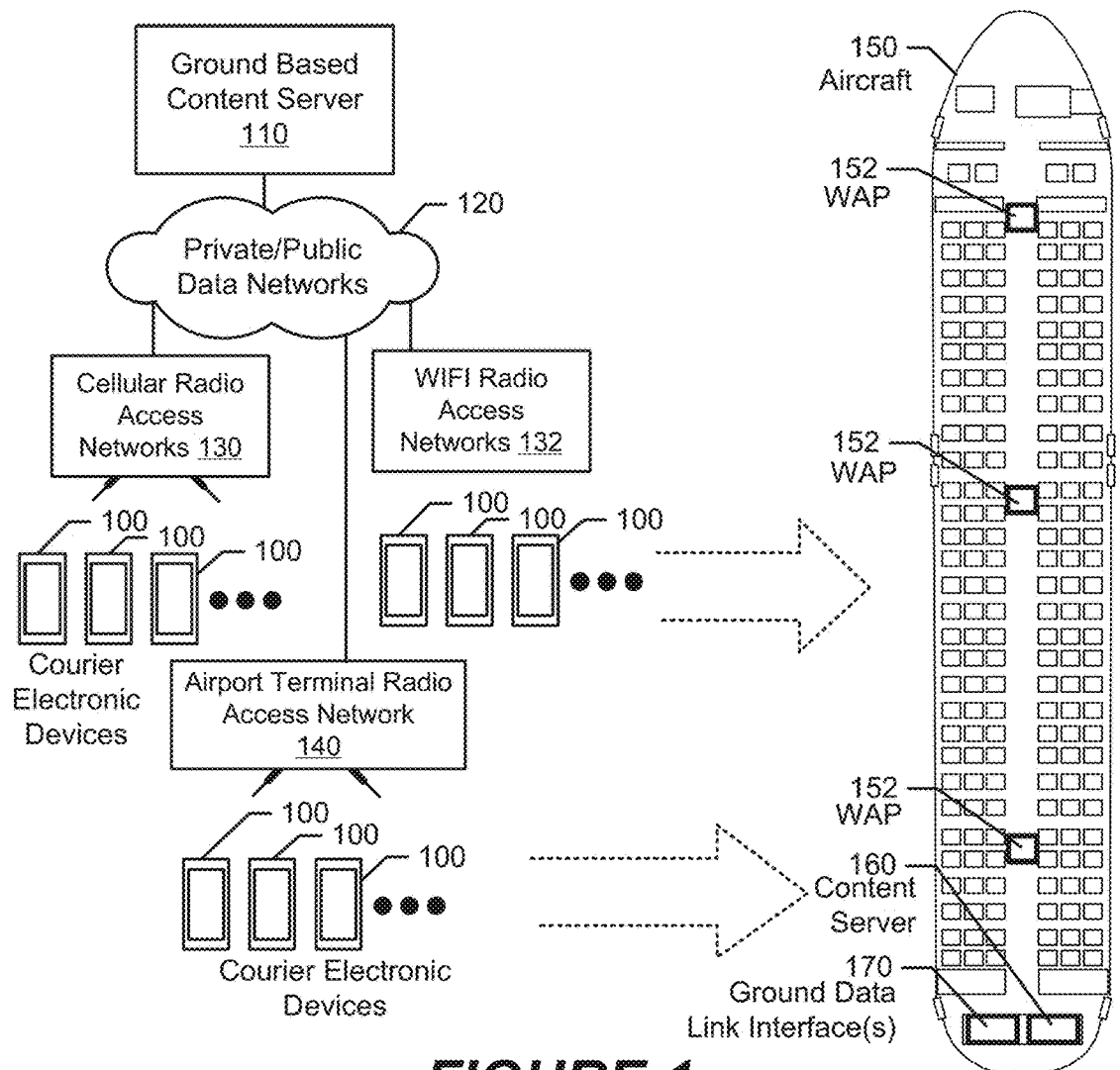
FIG. 1 is a block diagram of a content distribution system that transfers content files between a ground based server and aircraft based content servers via content fragments that are distributed across courier electronic devices for transportation onboard and off-board the aircraft, in accordance with some embodiments.

FIG. 1 is a block diagram of a content distribution system that transfers content files between a ground based server 110 and an aircraft 150 based content server 160 via content fragments that are distributed across courier electronic devices 100 for transportation onboard and off-board the aircraft 150, in accordance with some embodiments of the present disclosure.

Referring to FIG. 1, an IFE system provides entertainment services for passengers in a passenger cabin of the aircraft 150. The IFE system includes a content server 160 that stores content files which may include movies, television programming, games, applications, electronic books/magazines, etc. The aircraft based content server 160 can stream and/or download content of the content files to video display units (VDUs) that are installed within seatbacks and attached to seat armrests/frames, bulkheads, overhead structures, or elsewhere within the cabin. The content server 160 may additionally or alternatively stream and/or download content of the content files to VDUs of courier electronic devices 100 that are transported by passengers and/or crew members onboard and off the aircraft 150. Other content files that can be uploaded to the content server 160 can include airline operations data, flight related data including a passenger manifest, etc.

Passengers may also be provided in-flight shopping services through the seat VDUs and the courier electronic devices 100 based on product catalogs that are downloaded from the aircraft based content server 160. The content server 160 may include a product sales application that operates to allow passengers to purchase products through the seat VDUs and/or the courier electronic devices 100, and which stores product inventory listings and purchase transaction information for subsequent transfer to the ground based content server 110 and/or another content server.

The content server 160 may be communicatively connected to the seat VDUs and/or the courier electronic devices 100 through a wired data network (e.g., Ethernet cabling and electronic network interfaces) and/or a wireless data network. An example wireless data network is illustrated in FIG. 1 that includes a plurality of wireless access points (WAPs) 152 that are installed (mounted) at spaced apart locations within the aircraft 150 fuselage to provide corresponding wireless communication service cells. The WAPs 152 communicate through a wireless air interface that can be based on one or more communication protocols including, without limitation, any one or more of IEEE 802.11, WIMAX, 3GPP Long Term Evolution (LTE), etc.

The courier electronic devices 100 can include, without limitation, tablet computers, laptop computers, palmtop computers, cellular smart phones, media players, etc. When owned by a passenger, a courier electronic device 100 can also be referred to as a passenger electronic device (PED).

The aircraft 150 may also include a ground data link interface 170 that is configured to provide wireless data communications through a satellite communication system and/or through direct aircraft-to-ground communication links. The ground data link interface 170 may be any ground connectivity system that provides data communications capabilities for aircraft within range of ground based communications network equipment located at airports, using radio transceiver circuits located onboard the aircraft and at airports (e.g., at gate locations). The wireless communications may be performed using IEEE 802.11, WIMAX, and/or 3GPP LTE technologies. The aircraft can be recognized by the ground network when it arrives at an airport or gate, and a communication link can be established between the aircraft based content server 160 and a ground based content server 110 via the ground network.

Updating content files for aircraft based content servers 160 can require a large amount of data to be transferred from the ground based content server 110 to the aircraft based content servers 160 and, potentially, vice versa. In an upload direction to the aircraft 150, movie and television programs, weather reports, news reports, electronic publications, passenger manifests, airline operations data, and other content can be amongst the types of content files that must be transferred from the ground based content server 110 to the aircraft based content server 160. In the download direction from the aircraft 150, it can be desirable to transfer content generated during the flight, including IFE usage statistics, onboard food inventory reports, onboard product inventory reports, and onboard electronic systems health monitoring reports, from the aircraft based content server 160 to the ground based content server 110 upon each arrival of the aircraft 150 to an airport terminal.

Unfortunately, the short range of IEEE 802.11 network protocols requires that system implementation involve modification of the airport facility from the facility backhaul network to the aircraft gates. Cellular networks can also be used to transfer information to and from an aircraft while it is on the ground, but the relatively low bandwidth supported by such networks and associated cost per megabyte for transferring data can make transfer of IFE, related content files and other large files insufficiently fast to enable completion of transfer of content files while the aircraft 150 remains at an airport between flights and, even if completed, may result in prohibitive costs to do so.

Broadband satellite communications can be used to exchange data between an in-flight aircraft and the ground based content server 110. However, performance of satellite communications systems varies between the lower speed satellite communications (SATCOM) based systems (X.25, Swift64 or BGAN) to the higher speed KU band systems (ConneXion, Row44). In general, these satellite links are limited to between 64 Kbps and 20 Mbps. This bandwidth must be shared by all users in a large geographical area. In addition, the current regulations on aircraft based KU Band and/or KA Band service do not permit aircraft to ground transmission to occur while the aircraft is on the ground. A single channel would be shared by many different aircraft at many different airports. Moreover, using satellite communications to transfer IFE related content files and other large files can be prohibitively expensive.

For these and other reasons, various embodiments disclosed herein are directed to using the courier electronic devices 100 to transfer content files between the ground based content server 110 and the aircraft based content server 160. More particularly, the content distribution system transfers content files between the ground based server 110 and the aircraft based content server 160 via content fragments that are distributed across the courier electronic devices 100 for transportation onboard and off-board the aircraft 150 by passengers.

Figure 3:
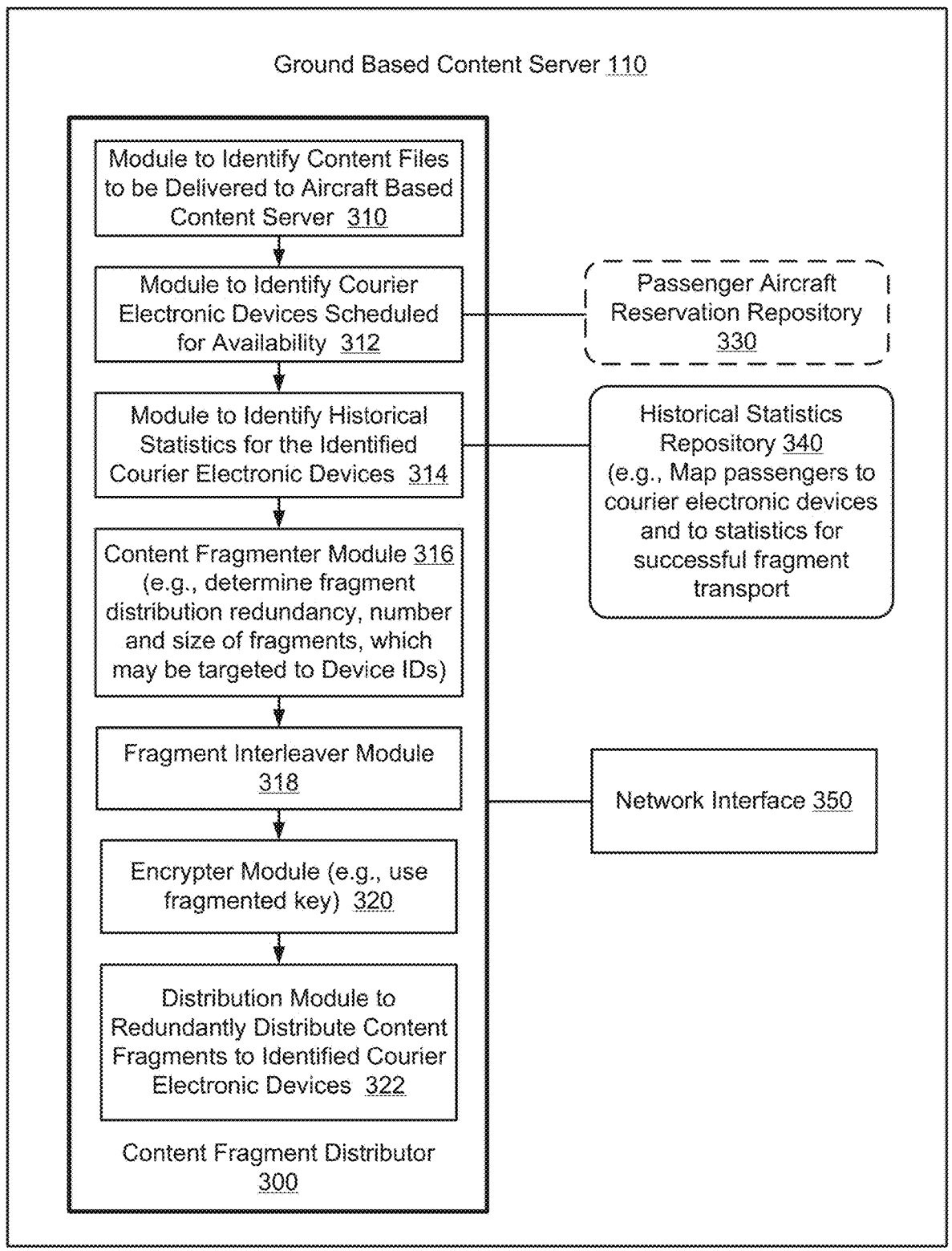
FIG. 3 is a block diagram of operational components of the ground based content server of FIG. 1 that generate and distribute content fragments to courier electronic devices for transport onboard a target aircraft, in accordance with some embodiments.

FIG. 3 is a block diagram of operational components of the ground based content server 110 of FIG. 1 that generate and distribute content fragments to the courier electronic devices 100 for transport onboard a target aircraft, in accordance with some embodiments of the present disclosure. Content server 110 includes a content fragment distributor 300, a network interface 350, and may include a historical statistics repository 340 and a passenger aircraft reservation repository 330 that will be explained in further detail below.

Referring to FIGS. 1 and 3, to transfer content files to the aircraft 150, the ground based content server identifies (module 310) content files that are to be delivered to the vehicle based content server 160 on a target vehicle. Courier electronic devices 100 are identified (module 312) which are associated with persons who are scheduled to become passengers on the target vehicle 150 where the content files are desired to be transferred. Each of the content files are fragmented (module 316) into content fragments, where the content fragments collectively contain all data necessary for reassembling the content files. In contrast, at least one, and perhaps all, of the content fragments is generated to not contain enough data to allow reassembly of any one of the content files, according to at least one embodiment. The content fragments are then distributed (module 322) from memory of the ground based content server 110 across memory of the courier electronic devices 100 that have been identified.

Identification (module 312) of courier electronic devices 100 that are associated with persons who are scheduled to become passengers on the target vehicle 150, can include operating during a flight reservation session between an application executed by one of the courier electronic devices 100 and a passenger aircraft reservation repository 330 contained in or otherwise accessible to the ground based content server 110, to receive a message from the one of the courier electronic devices 100 indicating permission for the ground based content server 110 to transfer a content fragment to memory of the one of the courier electronic devices 100 for relay to the vehicle based content server 160 of the target vehicle 150. Distribution (module 322) of the content fragments from memory of the ground based content server 160 across memory of the courier electronic devices 100 can include operations for, responsive to the message, communicating the content fragment to memory of the one of the courier electronic devices 100 and initiating operations by the one of the courier electronic devices 100 to respond to subsequent establishment of a communication link between the one of the courier electronic devices 100 and the vehicle based content server 160 of the target vehicle 150 by transferring the content fragment to the vehicle based content server 160.

The distributing is performed so that each of the courier electronic devices 100 is distributed one of the content fragments containing data that is at least partially redundant with data contained in one of the content fragments that is distributed to at least one other one of the courier electronic devices 100 and that is not redundant to data contained in other ones of the content fragments that are distributed to still other ones of the courier electronic devices 100.

Generating some of the content fragments so that they contain redundant data can be advantageous because it is foreseeable that at least some of the identified courier electronic devices 100 will not be brought onboard the target aircraft 150 by the associated passengers for a flight, will not establish a communication link to the aircraft based content server 160 to enable transfer thereto, or will not remain connected for sufficient time to allow completion of transfer of the content fragments therein to the aircraft based content server 160 (e.g., due to insufficient battery life and/or unexpected passenger interruption of the transfer). Because at least some of the content fragments contain redundant data, the aircraft based content server 160 can assemble the content file using data from a plurality of received content fragments in spite of some of the content fragments not been received completely and/or having no portion thereof received.

Distribution of the content fragments from the ground based content server 110 to the courier electronic devices 100 may be performed through a network interface 350 and communicatively connected to public data networks and/or private data networks 120, e.g., Internet, and wireless and/or wired data networks connected to the courier electronic devices 100. Transfer of the content fragments may be performed during a person's reservation of a scheduled flight on the target aircraft 150 and/or thereafter using cellular radio access networks 130 and/or WiFi radio access networks 132, and/or while at an airport terminal awaiting the scheduled flight using various airport terminal radio access networks 140.

An amount of the redundancy in the data of at least some of the content fragments that are to be distributed across the courier electronic devices 100, can be controlled (module 316) based on a number of the courier electronic devices 100 that have been identified as being associated with persons who are scheduled to become passengers on the target aircraft 110. In one embodiment, the amount of redundancy is increased based on identifying a greater number of the courier electronic devices 100 that are associated with persons who are scheduled to become passengers on the target vehicle 150. Similarly, the amount of redundancy is decreased based on identifying a lesser number of the courier electronic devices 100 that are associated with persons who are scheduled to become passengers on the target vehicle 150.

For example, assume 20 courier electronic devices 100 would be needed to transport a collection of content fragments needed to assemble a content file, due to constraints of available memory in those courier electronic devices 100 and/or due to one or more defined rules that constrain how much memory, communication bandwidth, battery power, and/or other resources of any one or more courier electronic devices 100 that can be used to transfer data between the ground based content server 110 and the aircraft based content server 160. In one approach, the content fragments are transferred to be spread across the first 20 courier electronic devices 100 that are identified as being associated with persons who are scheduled for a same flight on the target aircraft 150. However, there is a risk that one or more of those 20 courier electronic devices 100 will not be transported onto the target aircraft 150 or will not otherwise operate to complete transfer of their respective content fragments to the aircraft based content server 160, e.g., due to insufficient battery life or the passenger turning off the device. This would result in the aircraft based content server 160 being unable to reassemble the content file because of one or more necessary content fragments not being available. The content fragments could be transferred to be spread across more than 20 courier electronic devices to 100 so that there is a greater likelihood that at least 20 of the courier electronic devices 100 will successfully complete their respective content fragments to the aircraft based content server 160. However, there's still a risk that a necessary one of the content fragments will not be successfully uploaded from the one or more courier electronic devices 100 storing the necessary content fragment. Thus, in at least one embodiment, the content fragments are generated with partially redundant data so that, in the above example, receipt of 20 or more content fragments from any of the courier electronic devices 100 can enable the aircraft based content server 160 to successfully reassemble the content file.

In a further embodiment, the amount of redundancy used when generating the content fragments is controlled based on use of historical statistics developed from reports of successful transfers completed in the past for content fragments transported from the ground based content server to vehicle based content servers using the courier electronic devices associated with the persons who are scheduled to become passengers on the target vehicle. In the example of FIG. 3, the ground based content server 110 can contain or otherwise access a historical statistics repository 340 which contains information mapping passengers' names or other identifiers to courier electronic devices' identifiers (e.g., mobile phone serial numbers and/or other IDs), and further maps that information to statistics for prior reported uses of the identified courier electronic devices that successfully and/or unsuccessful completed transport of content fragments from the ground based content server 110 to aircraft based content servers 160. For privacy reasons or other purposes the historical statistics repository 340 may map anonymized passenger identifiers, instead of passenger names, to courier electronic device identifiers. The statistics may particularly identify which aircraft based content servers 160 the transfers were completed for, so that the statistics reflect a particular passenger's likelihood of using a particular courier electronic device in a way that allows successful transfer of a content fragments. For example, the statistics may indicate that a particular passenger has brought onboard and allowed their cellular phone to complete such transfers during each of two flights between two identified cities and during each of three flights between three other identified cities, the ground based content server 110 can use those statistics to more accurate predict the likelihood that the particular passenger will properly serve as a reliable courier of a data fragment for a particular upcoming scheduled flight between a pair of those same identified cities. Alternatively or additionally, the statistics may identify the flight durations and completed transfers, so that the ground based content server 110 can predict the likelihood that the particular passenger will properly serve as a reliable courier of a data fragment for a particular upcoming scheduled flight having a scheduled flight duration having a defined similarity to (e.g., within a threshold range of) one of the flight durations indicated by the statistics.

In one embodiment, the amount of redundancy is increased based on the historical statistics indicating a lower likelihood of at least some of the courier electronic devices 100, which are associated with persons who are scheduled to become passengers on the target vehicle 150, being both present and operated upon boarding of the vehicle 150 by the passengers to allow successful transfer of the content fragments from the at least some of the courier electronic devices 100 to the vehicle 150 to enable reassembly of the content files by the vehicle based content server 160. Similarly, the amount of redundancy is decreased based on the historical statistics indicating a higher likelihood of the at least some of the courier electronic devices 100, which are associated with persons who are scheduled to become passengers on the target vehicle 150, being both present and operated upon boarding of vehicle 150 by the passengers to allow successful transfer of the content fragments from the at least some of the courier electronic devices 100 to the vehicle 150 to enable reassembly of the content files by the vehicle based content server 160.

The amount of the redundancy can be controlled based on a number of the courier electronic devices 100 that have completed receipt of the content fragments from the ground based content server 110 for transport to the target vehicle 150. In one embodiment, once content fragments have been transferred to a threshold number of courier electronic devices 100, e.g., which may be sufficient to enable reassembly of a content file, further content fragments can be generated to contain data that is redundant with the earlier content fragments and which are then distributed to at least some subsequently identified courier electronic devices 100 to increase the likelihood that the aircraft based content server 160 will receive sufficient data from enough courier electronic devices 100 to enable reassembly of the content file upon boarding of the passengers.

Continuing reference to FIG. 3, when dividing (module 316) each of the content files into content fragments, size of the content fragments can be controlled based on a number of the courier electronic devices 100 that are identified as associated with persons who are scheduled to become passengers on the target vehicle 150.

In one embodiment, size of the content fragments is controlled based on use of historical statistics developed from reports of successful transfers completed in the past for content fragments transported from the ground based content server to vehicle based content servers using the courier electronic devices associated with the persons who are scheduled to become passengers on the target vehicle. Statistics obtained from the historical statistics repository 340 can be used to determine the size of the content fragments are to be generated. When passengers and associated courier electronic devices 100 are identified as having statistics that are favorable to the likelihood that content fragments transferred thereto will be successfully uploaded to the aircraft based content server 160, the content fragments can be generated to be larger since there is a higher likelihood of successful transfer. In contrast, when the statistics indicating less favorable likelihood that content fragments transferred thereto will be successfully uploaded, the content fragments can generate a smaller and dispersed across a greater number of courier electronic devices 100 to compensate for lower historical success rate for those courier electronic devices 100. The size of content fragments can be further controlled in a similar manner to that described herein for controlling redundancy based on information contained in the historical statistics repository 340.

The content fragment distributor 300 may interleave (module 318) data contained in the content fragments to generate interleaved content fragments. The interleaved content fragments are then distributing from the memory of the ground based content server 110 across memory of the courier electronic devices 100. Interleaving data contained in the content fragments can enable reassembly of a content file in spite of some otherwise necessary content fragments not been received by the aircraft based content server 160 from certain courier electronic devices 100.

In one embodiment, when dividing (module 316) each of the content files into content fragments, an amount of redundancy of data contained in some of the content fragments is decreased based on identifying a greater number of the courier electronic devices 100 associated with persons who are scheduled to become passengers on the target vehicle 150. In contrast, the amount of redundancy of data contained in some of the content fragments is increased based on identifying a lesser number of the courier electronic devices 100 associated with persons who are scheduled to become passengers on the target vehicle 150.

The content fragment distributor 300 may encrypt (module 320) the content fragments before distribution to the courier electronic devices 100. Encrypting data contained in the content fragments can prevent a person who possesses the courier electronic device 100 from using the data. The content fragment distributor 300 may alternatively or additionally interleave data contained in a content file across a plurality of content fragments. Interleaving data in this manner can increase the ability of the receiving device to reassemble the original content firm in spite of missing one of the data fragments.

Figure 2:
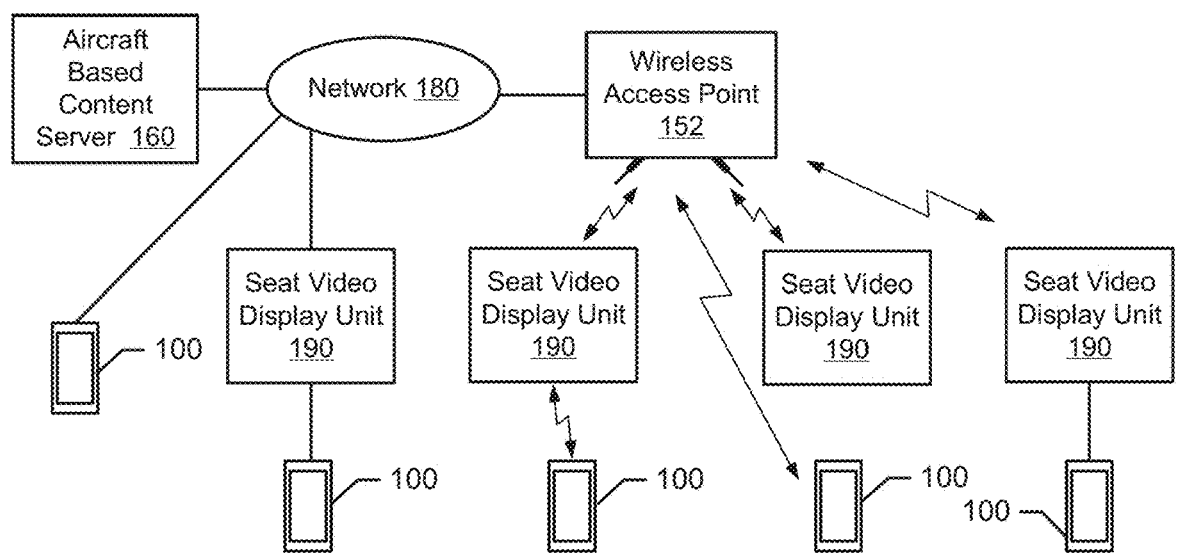
FIG. 2 is a block diagram of an aircraft onboard content distribution system that transfers content fragments between onboard courier electronic devices and an aircraft based content server, in accordance with some embodiments.
Figure 4:
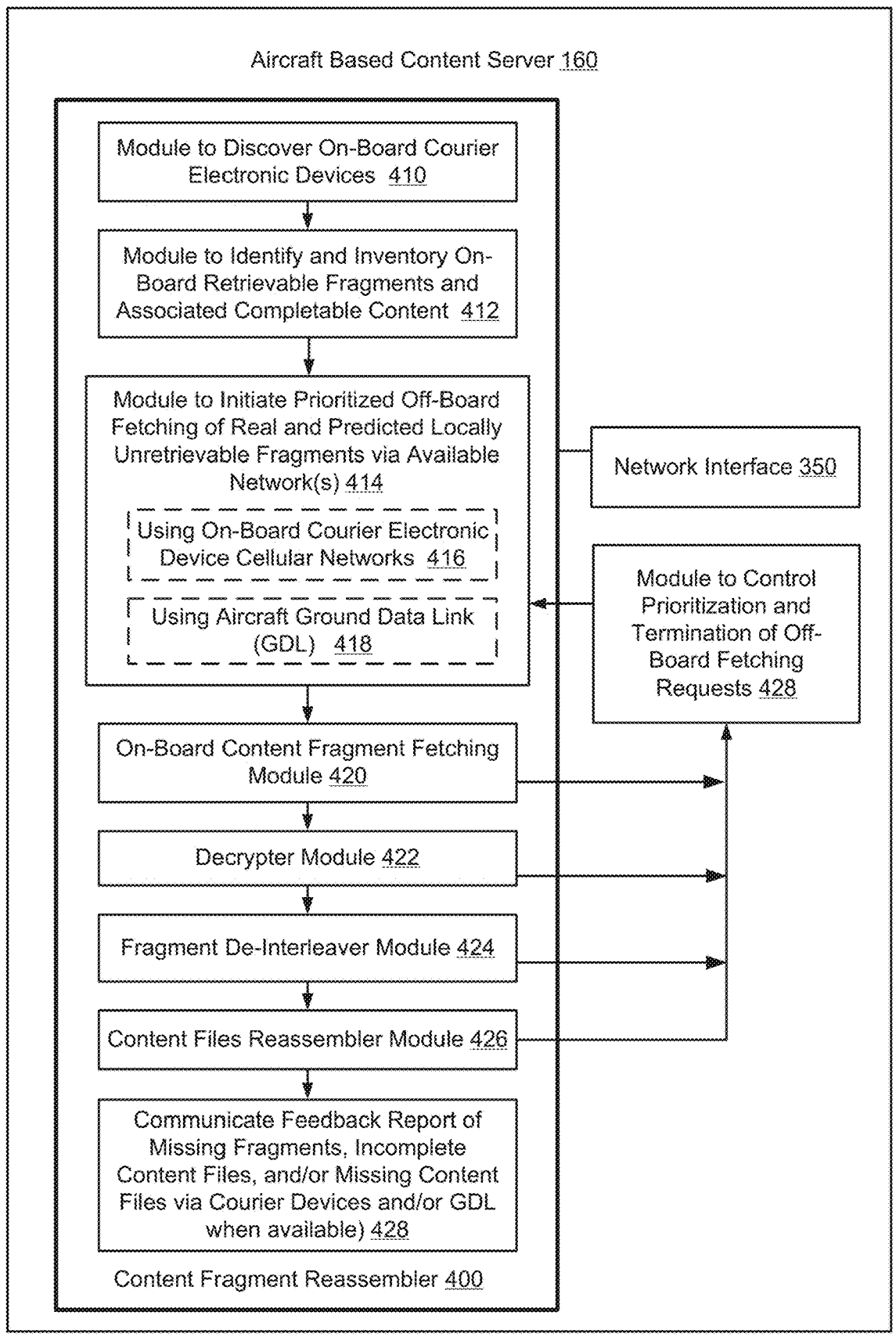
FIG. 4 is a block diagram of operational components of the aircraft based content server of FIG. 1 that receive content fragments from onboard courier electronic devices and reassemble the original content files, in accordance with some embodiments.

FIG. 2 is a block diagram of an aircraft onboard content distribution system that transfers content fragments between onboard courier electronic devices 100 and the aircraft based content server 160, in accordance with some embodiments of the present disclosure. FIG. 4 is a block diagram of operational components of the aircraft based content server 160 of FIG. 1 that receive content fragments from onboard courier electronic devices 100 and reassemble the original content files, in accordance with some embodiments of the present disclosure.

Referring to FIGS. 2 and 4, the aircraft based content server 160 discovers (module 410) presence of content fragments stored in memory of courier electronic devices 100 that have been transported onto the vehicle 150 by passengers and which have established communication links with the vehicle based content server 160. The vehicle based content server 160 may communicate via a data network 180 and wired connections to some onboard courier electronic devices 100 and/or wireless connections to other onboard courier electronic devices 100. Wired communication links may be established using network interfaces (e.g., USB ports) located at passenger seats, which may be connected to seat video display units 190 at each seat location. Wireless communication links may be established through wireless access points 152. Some courier electronic devices may wirelessly communicate directly with the wireless access points 152. Some other courier electronic devices 100 may wirelessly communicate indirectly with the wireless access points 152 via seat video display units 190 which relay communications directly between those courier electronic devices 100 and the wireless access points 152. Still some other current electronic devices may communicate through wired connections to the seat video display units 190 (e.g., via USB ports) which relay data through wireless links with the wireless access points 152.

The aircraft based content server 160 fetches (module 420) the content fragments from the courier electronic devices 100, responsive to the discovering. The content server 160 reassembles module 426) the content files by combining at least some of the content fragments, and provides content of the content files for playing through video display units operated by passengers.

As explained above, the reassembled content can be streamed and/or downloaded to seat video display units 190 and/or to courier electronic devices 100 responsive to user content requests. To provide the content files to passengers, the aircraft based content server 160 can add the content files to a listing of content files that are available for on-demand consumption through the video display units, and may further respond to on-demand content selection messages by streaming the content of the content files to the video display units attached to passenger seats, e.g., seat video display units 190, and/or to video display units within passenger courier electronic devices.

The aircraft based content server 160 may additionally or alternatively provide the content files to the crew information terminals that may be mounted within the aircraft 150 and/or transported onboard by crewmembers.

To fetch (module 420) the content fragments from the courier electronic devices 100, the aircraft based content server 160 can initiate concurrent transfer of the content fragments from the courier electronic devices 100. For example, as each courier electronic device 100 is carried onboard the aircraft 150 and establishes a communication link to the content server 160, the content server 160 can responsively communicate with the courier electronic device 100 to initiate transfer of its content fragment while ongoing transfer of other content fragments are being performed with earlier initiated transfers from other courier electronic devices 100 and which may continue current with subsequently initiated transfers of content fragments from subsequently identified courier electronic devices 100.

The content fragments being transferred from a first group of the courier electronic devices can contain data that is at least partially redundant with each other within the first group, and the content fragments being transferred from a second group of the courier electronic devices can contain data that is at least partially redundant with each other within the second group. The remaining transfer of content fragments from at least one of the first group of the courier electronic devices 100 can be terminated by the aircraft based content server 160 responsive to completing assembly of a first content file from a combination of partial content fragments received from at least some of the first group of the courier electronic devices 100 using the redundant data therein to supply data not yet received from the at least one of the first group of the courier electronic devices 100. Similarly, the remaining transfer of content fragments from at least one of the second group of the courier electronic devices 100 can be terminated by the aircraft based content server 160 responsive to completing assembly of a second content files from a combination of partial content fragments received from at least some of the second group of the courier electronic devices 100 using the redundant data therein to supply data not yet received from the at least one of the second group of the courier electronic devices 100.

The aircraft based content server 160 can identify (module 412) a content file that cannot be assembled because of at least one content fragment which is required to assemble the content file but is missing from memory of the courier electronic devices 100 discovered as having established communication links with the vehicle based content server 160. While off-board communications are permitted by courier electronic devices 100, such as before the cabin doors are closed in preparation for aircraft takeoff, the aircraft based content server 160 can attempt to fetch the missing content file through one or more of the identified courier electronic devices 100 off-board communication capability, such as through a cellular communication transceiver of the courier electronic device(s) 100 (block 416).

Accordingly, the aircraft based content server 160 can identify through the communication links which of the courier electronic devices 100 have ongoing off-board communication links that can be used to retrieve content fragments from the ground based content server, and fetch the at least one content fragment from the content server using communications routed through at least one of the courier electronic devices identified as having the ongoing off-board communication links.

In one embodiment, the aircraft based content server 160 communicates a message through one of the wireless access points 152 to an application on one of the courier electronic devices 100, which causes the courier electronic device 100 to use a cellular transceiver of the courier electronic device 100 to communicate through a cellular network outside the aircraft 150 to establish a communication link with the ground based content server 110 and fetch the missing content fragment(s) therefrom. The aircraft-based content server 160 may similarly communicate with a plurality of the identified courier electronic devices 100 to initiate concurrent fetching of the same missing content fragment from the ground based content server 110 through the cellular transceivers of the respective courier electronic devices 100. Such redundant fetching operations can increase the likelihood that the missing content fragment will be successfully retrieved by at least one of the initiated transfers.

A module 428 may control initiation and termination of such off-board fetching of content fragments via identified ones of the courier electronic devices 100 based on prioritization of which of the content fragments are most needed to enable assembly of content files having relative prioritized importance. When concurrent redundant transfers are initiated for the same missing content fragment, successful receipt and/or reassembly of the missing content fragment through one or more of the operated courier electronic devices 110 triggers the module 428 to terminate any continuing fetching of that same content fragment by other ones of the courier electronic devices 100. In one embodiment, the module 428 terminates any continuing fetching of that same content fragment by other ones of the courier electronic devices 100 when a threshold number (e.g., one) of the courier electronic devices 100 successfully receives that content fragment and before that content fragment has been relayed from the courier electronic device(s) 100 to the aircraft based content server 160. This early terminal allows more efficient use of communication resources of the courier electronic devices 100 (i.e., reducing communication costs imposed on the passenger(s)) since transfer of a large content fragment from the courier electronic device(s) 100 to the aircraft based content server 160 may take minutes during which continuing transfer of the content fragment by some of the courier electronic device(s) 100 from off-board to onboard the aircraft is anticipated to be unnecessary.

Similarly, responsive to the missing content fragment being subsequently identified as available on a threshold number of onboard courier electronic devices 100, the module 428 can terminate any continuing fetching of that same content fragment by the courier electronic devices 100. In this manner, the aircraft based content server 160 can rapidly initiate fetching of missing content fragments as courier electronic devices 100 are brought onboard and linked to the aircraft based content server 160, and such transfers can be dynamically controlled to prioritize continuing transfer of only those content fragments that remain identified as being unavailable among any of the courier electronic devices 100 that are subsequently brought onboard and linked to the aircraft based content server 160.

The aircraft based content server 160 may additionally or alternatively use an available aircraft ground data interface 170 to fetch (module 418) the missing content fragment through a cellular communication link. Thus, the courier electronic devices 110 can reduce or in some situations eliminate the need for use of the ground datalink interface 170 for transferring content files onboard and off-of the aircraft 150.

In some embodiments, the ground based content server 110 or other ground connectivity component can communicate with the courier electronic devices 100 to track their location, e.g., via GPS, with respect to an aircraft and, perhaps, before the courier electronic devices 100 have become connected to the onboard aircraft communication network. The ground based content server 110 can track proximity of the courier electronic devices 100 to a departure location and time of the aircraft to predict the probability of various content fragments being carried onto the aircraft, and can responsively control download of content fragments to those or other courier electronic devices 100. Furthermore, the ground based content server 110 may track progress of ongoing transfers of content fragments from courier electronic devices 100 to the onboard content server 160 and predict the probability of various content fragments successfully completing the transfer, and may responsively control download of content fragments to those or other courier electronic devices 100.

In some further operations, the aircraft based content server 160 identifies (module 412) a plurality of content files that cannot be assembled because of absent content fragments which are required to assemble the plurality of content files but are missing from memory of the courier electronic devices 100 discovered as having established communication links with the vehicle based content server 160. The content server 160 identifies through the communication links which of the courier electronic devices 100 have ongoing off-board communication links (e.g., communication connections to cellular transceiver base stations outside the aircraft 150) that can be used to retrieve content fragments from the ground based content server, and concurrently fetches the absent content fragments from the ground based content server 110 using communications routed through a plurality of the courier electronic devices 100 identified as having the ongoing off-board communication links.

In one embodiment, a first group of the absent content fragments being fetched through a first group of the courier electronic devices 100 identified as having the ongoing off-board communication links contain data that is at least partially redundant with each other within the first group, and a second group of the absent content fragments being fetched through a second group of the courier electronic devices 100 identified as having the ongoing off-board communication links contain data that is at least partially redundant with each other within the second group.

The aircraft based content server 160 terminates (module 428) remaining fetching of the first group of the absent content fragments through at least one of the first group of the courier electronic devices 100 responsive to completing assembly of a first content file from a combination of partial fetches of the first group of the absent content fragments received from the ground based content server 110 using the redundant data therein to supply data not yet received from the at least one of the first group of the courier electronic devices 100. Similarly, the content server 160 terminates remaining fetching of the second group of the absent content fragments through at least one of the second group of the courier electronic devices 100 responsive to completing assembly of a second content file from a combination of partial fetches of the second group of the absent content fragments received from the ground based content server 110 using the redundant data therein to supply data not yet received from the at least one of the second group of the courier electronic devices 100.

To assemble the content files by combining at least some of the content fragments, the aircraft based content server 160 may decrypt (module 422) the content fragments to generate decrypted content fragments, de-interleaved (module 424) data contained in the decrypted content fragments to generate de-interleaved data, and assemble (module 426) the content files from the de-interleaved data.

The courier electronic devices 100 can similarly be used to transport content files from the aircraft based content server 160 to the ground based content server 110. The operations to perform such transfers can include the aircraft based content server 160 identifying downlink content to be delivered to the ground based content server 110 via the courier electronic devices 100. The downlink content is divided into downlink content fragments, where the downlink content fragments collectively contain all data necessary for reassembling the downlink content. The downlink content fragments are then distributed from the aircraft based content server across memory of the courier electronic devices that have been discovered. The distributing is performed so that each of the courier electronic devices 100 is distributed one of the downlink content fragments containing data that is at least partially redundant with data contained in one of the downlink content fragments that is distributed to at least one other one of the courier electronic devices 100 and that is not redundant to data contained in other ones of the downlink content fragments that are distributed to still other ones of the courier electronic devices 100. Distributing redundant data can provide various advantages as described above.

Figure 5:
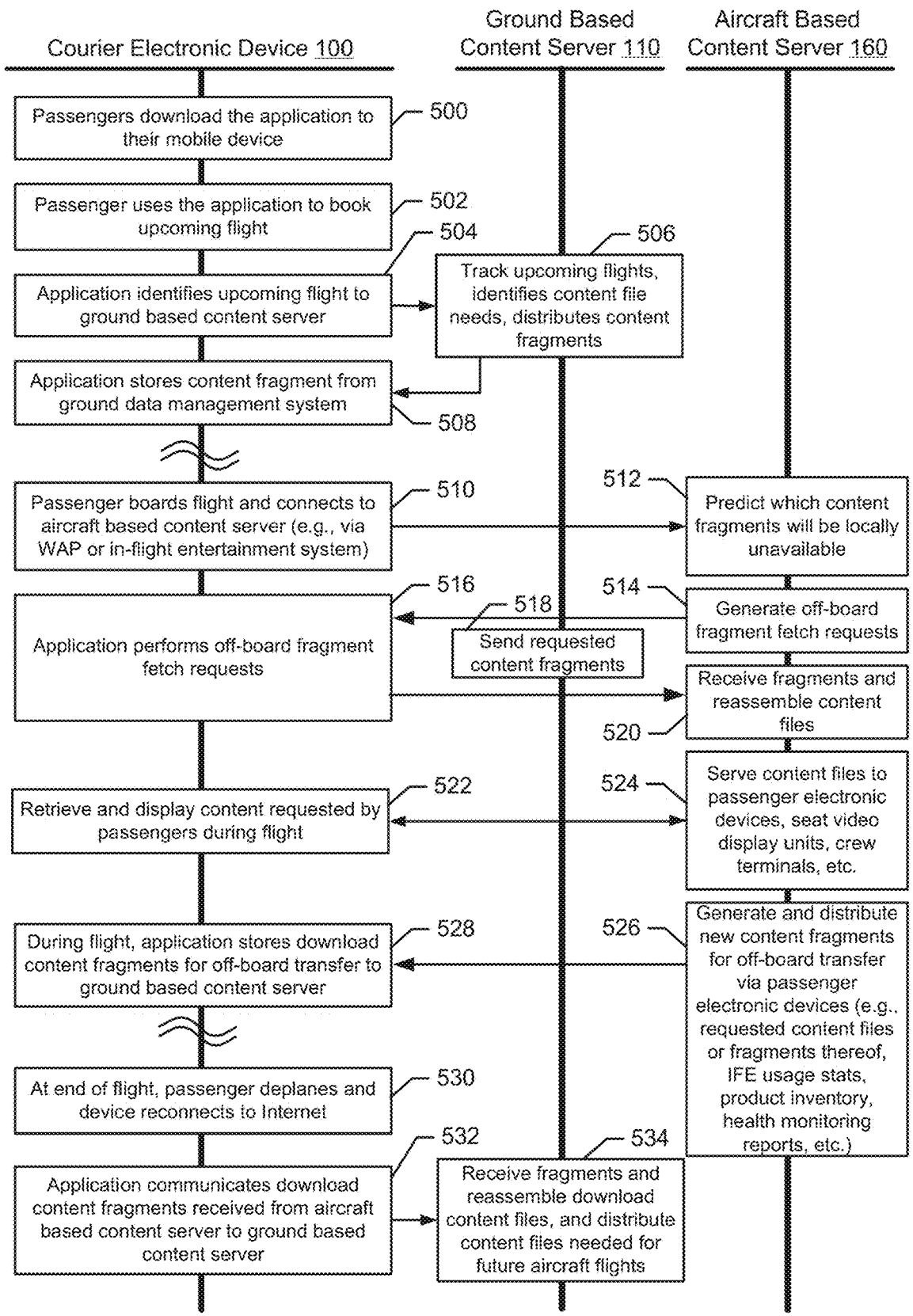
FIG. 5 is a combined flowchart and data flow diagram that illustrates operations and data transfers between a passenger electronic device, a ground based content server, and an aircraft based content server in accordance with some embodiments.

Various further operational embodiments are now described in the context of FIG. 5 which is a combined flowchart and data flow diagram that illustrates operations and data transfers between a passenger electronic device 100, the ground based content server 110, and the aircraft based content server 160. In the example of FIG. 5, the person is a planned passenger so the courier electronic device 100 is also referred to as a passenger electronic device 100.

Referring to FIG. 5, the passenger electronic device 100 communicates a scheduling message to the ground based content server 160 indicating an upcoming flight schedule for a person who possesses the courier electronic device 100. In the example embodiment, a person downloads (block 500) an application to the passenger electronic device 100 which performs operations for communicating with the ground based content server 110 and the aircraft based content server 160 to enable the passenger electronic device 100 to be used to transfer content fragments there between. The application may be a flight reservation application that is operated by a person to review available flight schedules and book (block 502) a scheduled flight through the ground based content server 110 and/or another ground based server. During the reservation process or separate therefrom, the application cooperatively identifies (block 504) the upcoming flight to the ground based content server 110. The ground based content server 110 tracks (block 506) upcoming scheduled flights and passenger electronic devices which are associated with passengers who have confirmed reservations on those flights, and identifies content files that are desired to be transferred to content servers of aircraft which are scheduled to perform or are otherwise likely to perform those flight schedules. The ground based content server 110 generates the content fragments from those content files as explained above.

The person may control whether the passenger electronic device 100 is allowed to be used to carry a content fragments to the aircraft for upload, such as through a user permission setting provided by the application. Persons may be incentivized by the airline to participate in allowing their devices to be used to receive content fragments from the ground based content server 110 and later upon boarding of the aircraft to perform further steps that will be necessary to allow the devices to establish communication links with the aircraft based content server 160 and remain operational for a sufficient time that will allow the airplane based content server 160 to complete transfer of content fragments therefrom. For example, upon boarding the aircraft a passenger may need to operate the passenger electronic device to establish a WiFi connection to a wireless access point 152 within the aircraft, and start the application to allow the application to perform the necessary transfer operation.

As an incentive from the airline for a passenger to participate in allowing successful transfer of one or more content fragments using the passenger's electronic device, the passenger may be provided free or discounted Internet access through in-cabin WiFi links to off-board satellite communication links, and/or may be provided free or discounted access to premium entertainment content through the aircraft IFE system.

Accordingly, when allowed, the ground based content server 110 transfers one or more content fragments to the passenger electronic device 100, which stores (block 508) the content fragments in local memory. Each content fragment can be an incomplete fragment of a content file, such that the content file cannot be regenerated using only data contained in the content fragment. Moreover, when the ground based content server 110 transfers a plurality of content fragments to the passenger electronic device 100, the plurality of content fragments may be an incomplete representation of the content file, such that the content file cannot be regenerated using only data contained in the plurality of content fragments.

Upon boarding an aircraft for the scheduled flight, the passenger operates (block 510) that passenger electronic device 100 to establish a communication link to the aircraft based content server 160 and initiate transfer of the content fragment from the local memory of the passenger electronic device 100 to the aircraft based content server 160. The aircraft based content server 160 may dynamically develop and inventory that identifies what content fragments are available among passenger electronic devices 100 that have been linked thereto, and may predict (block 512) therefrom which content fragments will be locally unavailable, such as due to some passenger electronic devices 100 not being present on the aircraft 150 and/or not been turned on or otherwise communicatively linked to the aircraft based content server 160.

The aircraft based content server 160 may then attempt to fetch the predicted locally unavailable content fragments using off-board communication links that are determined to be available between the passenger electronic devices 100 and ground based network equipment, e.g., cellular radio base stations, which is network connected to the ground based content server 110 and/or to use an off-board communication link that is determined to be available through the ground datalink interface 170. Because the ground data links may be available only while the aircraft remains at a gate or otherwise on the ground, there is a short window of opportunity for the aircraft based content server 160 to request and complete any fetching of locally unavailable content fragments from the ground based content server 110. The aircraft based content server 160 may therefore initiate fetching of the locally unavailable content fragments when a threshold number of passenger electronic devices 100 have been linked to the server 160 and while passengers are continuing to board the aircraft 150. Although the content fragments being uploaded to the aircraft based content server 160 may be used to reassemble a content file intended for use during a next flight segment, the content file may not be necessary for the next flight segment but more generally desired to be made accessible by the end of a longer time frame, such as within a week. When a content file is desired to be accessible by the end of a longer time frame the content fragments generated therefrom may be distributed to passengers who are scheduled to fly on that aircraft sometime during that time frame.

Aircraft based content server 160 therefore generates (block 514) off-board fragment fetch requests which are communicated to at least some of the passenger electronic devices 100. The off-board fragment fetch request messages contain information that identifies which content fragments are requested from the ground based content server 110 and identifies the network address of the ground based content server 110. The passenger electronic devices 100 respond to the off-board fragment fetch request messages by forwarding (block 516) the messages to the ground based content server 110 using the identified network address. The ground based content server 110 receives and responds to the request messages by sending (block 518) the requested content fragments to the application on the passenger electronic devices 100, which forwards the received content fragments to the aircraft based content server 160. The aircraft based content server 160 receives the previously missing content fragments from the passenger electronic device 100, and reassembles (block 520) the content files therefrom.

The aircraft based content server 160 can then serve content files to the passenger electronic devices 100, seat video display units, crew terminals, and other electronic devices that are communicatively connected to the aircraft based content server 160. For example, the passenger electronic devices 100 can display on a display device a list of available content files residing on the aircraft based content server 160, and respond to a passenger selection by communicating a content selection message to the vehicle based content server 160 indicating a person's selection of a content file from among the list of content files, which is triggers retrieving (block 522) and displaying of content of the selected content file, e.g., receive and display a streaming movie, from the aircraft based content server 160.

As explained above, the passenger electronic devices 100 can be used to transport content files from the aircraft based content server 160 to the ground based content server 110. The aircraft based content server 160 generates (block 526) new content fragments from content files that are to be carried off-board, and distributes the new content fragments to the passenger electronic devices 100. The content files and that may be selected for off-board transport can include, without limitation, IFE usage statistics, onboard food inventory reports, onboard product inventory reports, onboard electronic systems health monitoring reports, and flight performance reports. The passenger electronic device 100 receives and stores (block 528) the content fragment(s) downloaded from the aircraft based content server 160 for transfer to the ground based content server 110. At the end of the flight, the passenger deplanes and transports the passenger electronic device 100 to the airport terminal elsewhere where the passenger electronic device 100 reconnects (block 530) by operation of the application to the ground based content server 110 through a ground based communication network. Content files may be copied from one aircraft to another aircraft by dispersing the related content fragments to passengers who are scheduled to subsequently fly on the next aircraft.

The passenger electronic device 100, via the application, communicates (block 532) the content fragments received from the aircraft based content server 160 to the ground based content server 110, which receives the content fragments and reassembles (block 534) the content files from the aircraft based content server 160. The ground based content server 110 may distribute other content files to the passenger electronic device 100 if identified as being scheduled for a future aircraft flight.

Although various embodiments of been disclosed herein in the context of distributing entertainment content as fragmented files that are loaded across a plurality of courier electronic devices that are transported by passengers onboard an aircraft, these embodiments are not limited thereto. In particular, the embodiments disclosed herein may be used to distribute operating system software from a ground-based content server or other server to video display units located within an aircraft using carrier electronic devices to shuttle fragments of the operating system software. The content server 160 and/or the SVDUs 190 themselves can combine the operating system software fragments which are obtained from the plurality of carrier electronic devices to reassemble the operating system software or an operating system code update. The operating system software in the SVDUs 190 can be updated using the reassembled operating system software or reassembled operating system code update. When an operating system code update is provided by the carrier electronic devices, the operating system software in the SVDUs can be combined with the reassembled operating system code update to provide an updated operating system software for use by the SVDUs.

Example Content Server, Courier Electronic Device, and Seat Video Display Unit

Figure 6:
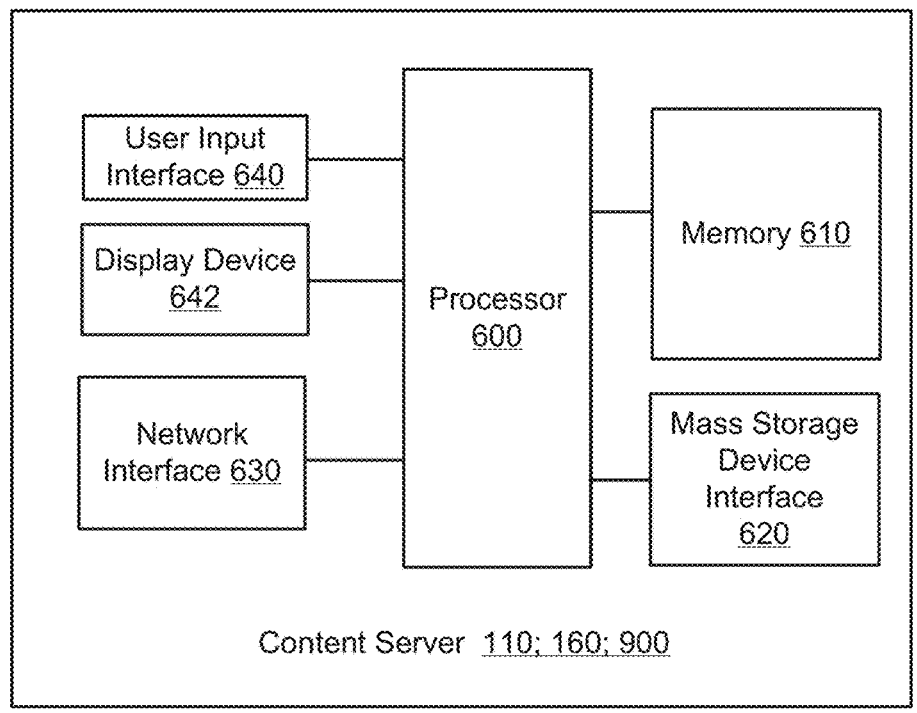
FIG. 6 is a block diagram of a content server configured to operate according to some embodiments.

FIG. 6 is a block diagram of a content server configured to operate according to some embodiments of the present disclosure. The content server may be configured to operate as the ground-based content server 110 and/or the aircraft based content server 160 disclosed herein. Referring to FIG. 6, the content server includes a processor 600, a memory 610, and a network interface 620 which may include a radio access network transceiver and/or a wired network interface (e.g., Ethernet interface). The network interface 620 is configured to communicate with courier electronic devices 100.

The processor 600 may include one or more data processing circuits, such as a general purpose and/or special purpose processor (e.g., microprocessor and/or digital signal processor) that may be collocated or distributed across one or more networks. The processor 600 is configured to execute computer program code in the memory 610, described below as a non-transitory computer readable medium, to perform at least some of the operations described herein as being performed by an access control computer. The computer program code when executed by the processor 600 causes the processor 600 to perform operations in accordance with one or more embodiments disclosed herein for the ground based content server 110 and/or the aircraft based content server 160. The content server may further include a user input interface 640 (e.g., touch screen, keyboard, keypad, etc.) and a display device 642.

Figure 7:
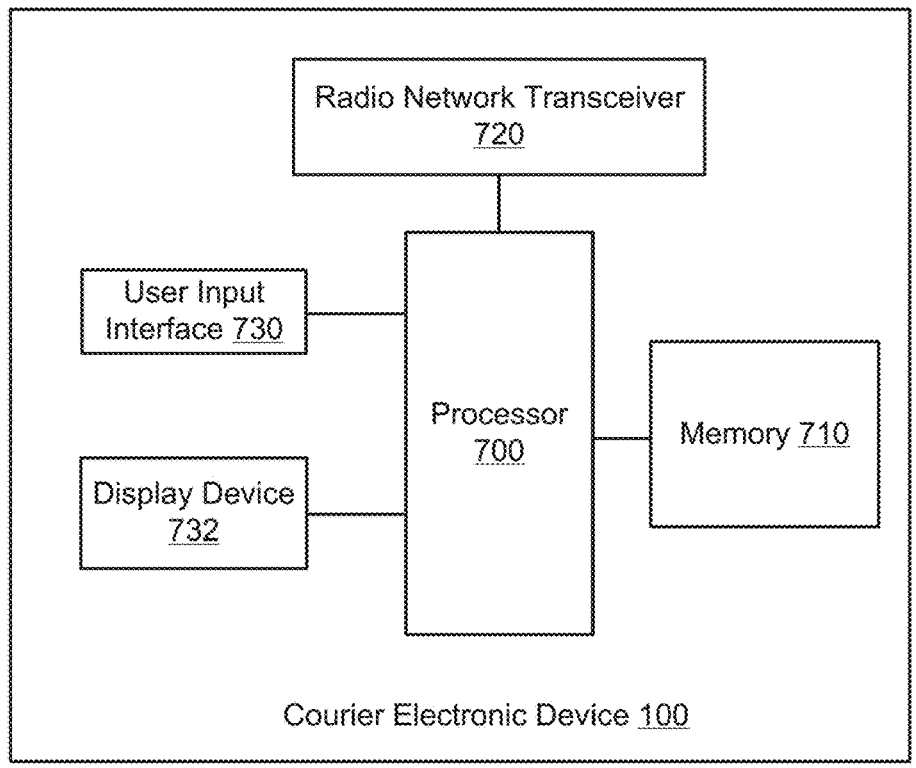
FIG. 7 is a block diagram of a courier electronic device configured to operate according to some embodiments.

FIG. 7 is a block diagram of a courier electronic device 100 configured to operate according to some embodiments of the present disclosure. Referring to FIG. 7, the courier electronic device 100 includes a processor 700, a memory 710, and a radio network transceiver 710 which can include, but is not limited to, a LTE or other cellular transceiver, WLAN transceiver (IEEE 802.11), WiMax transceiver, or other radio communication transceiver or wired network interface (e.g., Ethernet and/or USB) configured to communicate with the ground based content server 110 and/or the aircraft based content server 160.

The processor 700 may include one or more data processing circuits, such as a general purpose and/or special purpose processor (e.g., microprocessor and/or digital signal processor) that may be collocated or distributed across one or more networks. The processor 700 is configured to execute computer program code in the memory 710, described below as a non-transitory computer readable medium, to perform at least some of the operations described herein as being performed by an access control computer. The computer program code when executed by the processor 700 causes the processor 700 to perform operations in accordance with one or more embodiments disclosed herein for the courier electronic device 100. The courier electronic device 100 may further include a user input interface 730 (e.g., touch screen, keyboard, keypad, etc.) and a display device 732.

Figure 8:
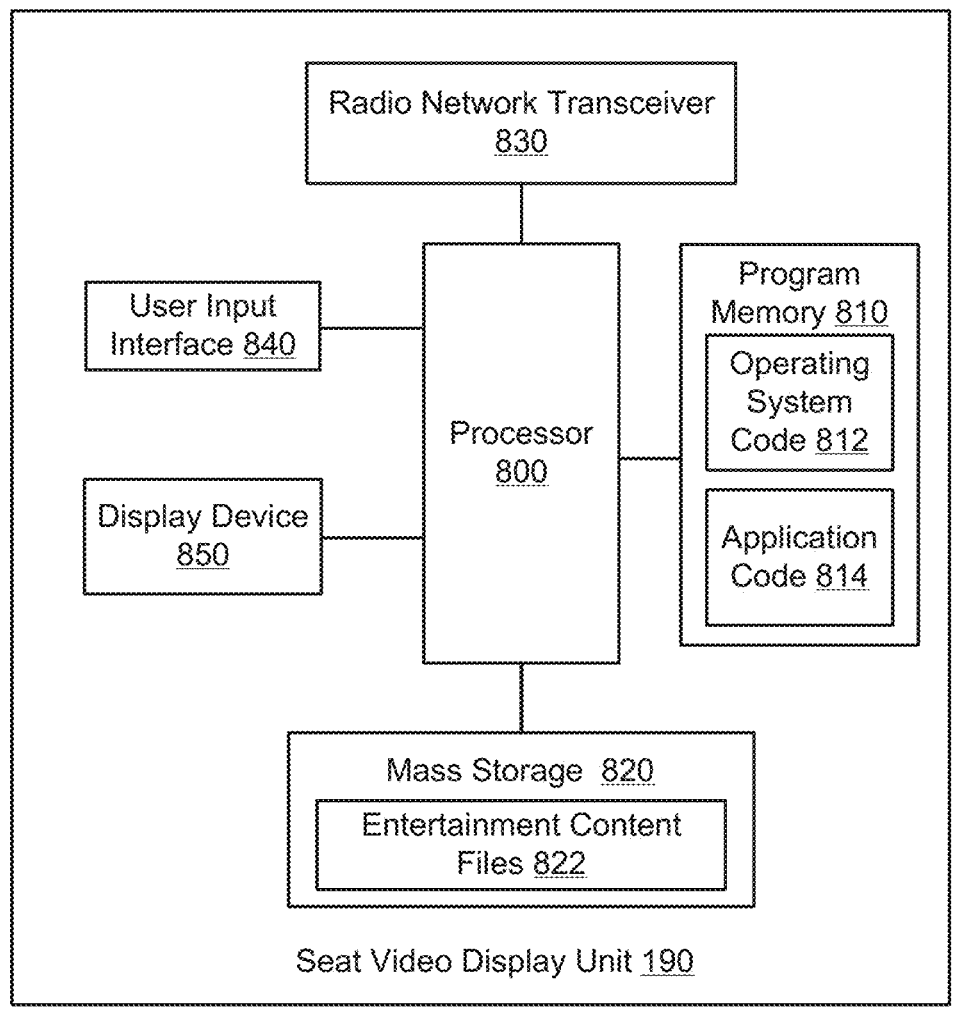
FIG. 8 is a block diagram of a SVDU which is configured to operate according to some embodiments.

FIG. 8 is a block diagram of a seat video display unit (SVDU) 190 that is configured to operate according to some embodiments of the present disclosure. Referring to FIG. 8, the SVDU 190 includes at least one processor 800, at least one program memory 810 containing operating system code 812 and application code 814, at least one mass storage device 820 containing entertainment content files 822, at least one radio network transceiver 830, a user input interface 840, and a display device 850. The operating system (OS) code 812 is configured to perform low-level operations for file read-write management within the mass storage device 820, provide an operating system environment for managing execution of application functionality provided by the application code 814, and may further operate to play movies, television shows, games, and other entertainment content among the files 822 readable from in the mass storage 820.

The processor 600 may include one or more data processing circuits, such as a general purpose and/or special purpose processor (e.g., microprocessor and/or digital signal processor) that may be collocated or distributed across one or more networks. The processor 600 is configured to execute computer program code in the memory 610, described below as a non-transitory computer readable medium, to perform at least some of the operations described herein as being performed by an access control computer. The computer program code when executed by the processor 600 causes the processor 600 to perform operations in accordance with one or more embodiments disclosed herein for the ground based content server 110 and/or the aircraft based content server 160. The content server may further include a user input interface 640 (e.g., touch screen, keyboard, keypad, etc.) and a display device 642.

Figure 9:
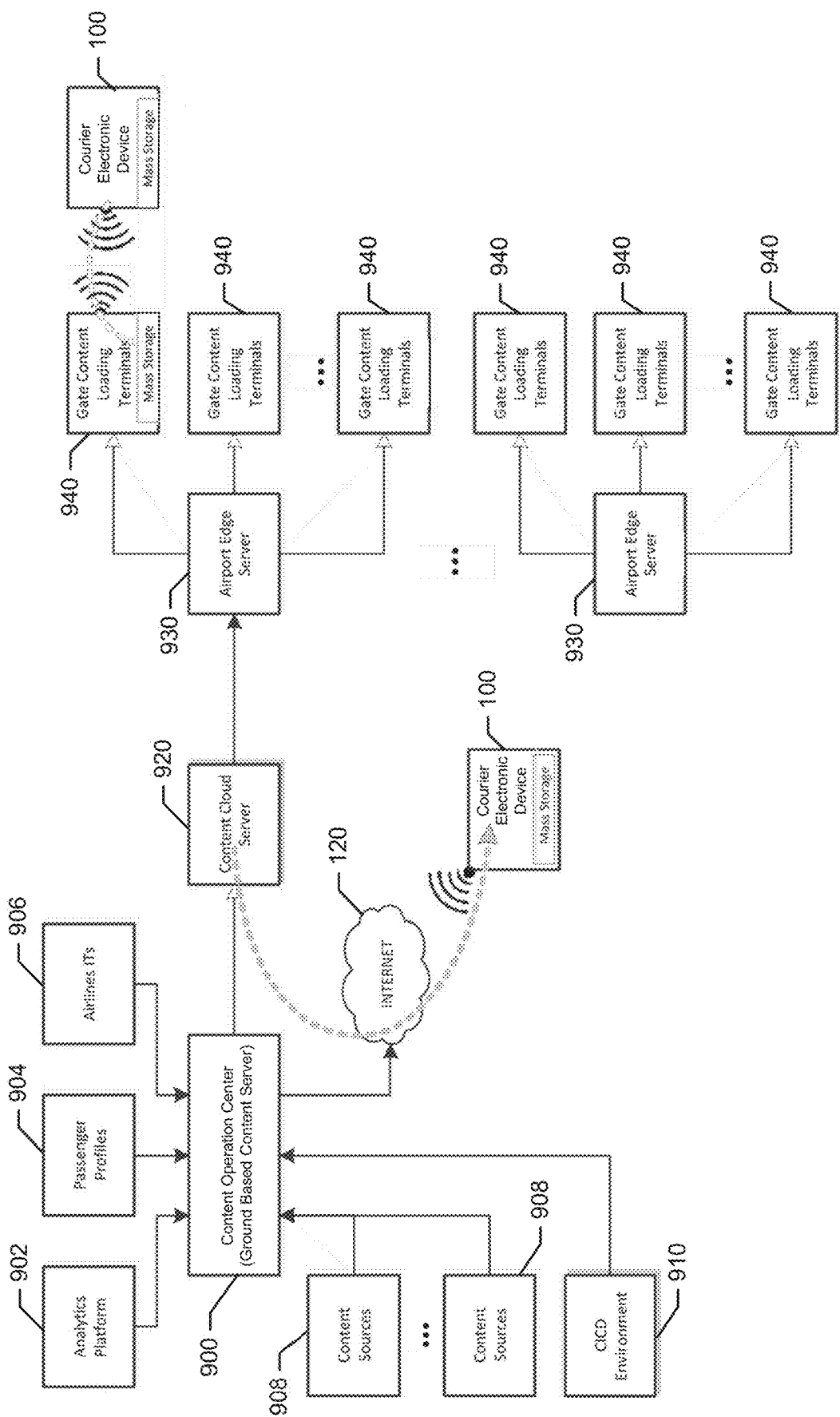
FIG. 9 is a block diagram of a ground-based system which is configured to update SVDU software and entertainment content according to some embodiments.

Ground-Based System for SVDU Operating System Code and Entertainment Content File Distribution FIG. 9 is a block diagram of a ground-based system which is configured for updating software and entertainment content according to some embodiments. Referring to FIG. 9, the system includes a content operation center 900 which functions as a ground-based server for serving entertainment content and seat video display unit (SVDU) operating system (OS) software to courier electronic devices 100 (which may be passenger electronic devices) for transport onboard an aircraft for purpose of updating onboard memory. The content operation center 900 is networked to a plurality of content sources containing entertainment content files and SVDU OS code updates. The content operation center 900 is also networked to a CICD environment 910 functionally responsible for continuous integration and continuous delivery of updated SVDU OS code updates and entertainment content file updates for use by SVDUs within vehicles, such as aircraft. The content operation center 900 selects which entertainment content files in the content sources 908 and/or which SVDU OS code updates to provide to which aircraft based on information provided by an analytics platform 902, based on passenger characteristic information provided by a passenger profile repository 904, and/or based on information obtained from an airline information technology repository 906. The selections by the content operation center 900 may be made specifically for targeted distribution to individual identified SVDUs on an identified aircraft, such as when the SVDUs onboard an aircraft lack network connectivity to a central content server which is also onboard the aircraft and/or when the SVDUs only have access to a limited bandwidth data network.

The content operation center 900 communicates through a data network 120, e.g., Internet, with a content cloud server 920 where SVDU OS code updates and entertainment content files may be temporarily stored for subsequent distribution to airport edge servers 934 relate to courier electronic devices. Alternatively or additionally, the content operation center 900 may communicate more directly with the courier electronic devices 100 through, e.g., wireless connections to an Internet access point (e.g., WiFi access point, cellular transceiver base station, etc.), to load the SVDU OS code updates and entertainment content files.

A plurality of airport edge servers 930 can receive and store the SVDU OS code updates and entertainment content files for subsequent distribution via gate loading terminals 940 to the mass storage memory of courier electronic devices. The gate loading terminals 940 may be mounted at gate areas locations of airport terminals, bus terminals, railroad terminals, etc.

Figure 12:
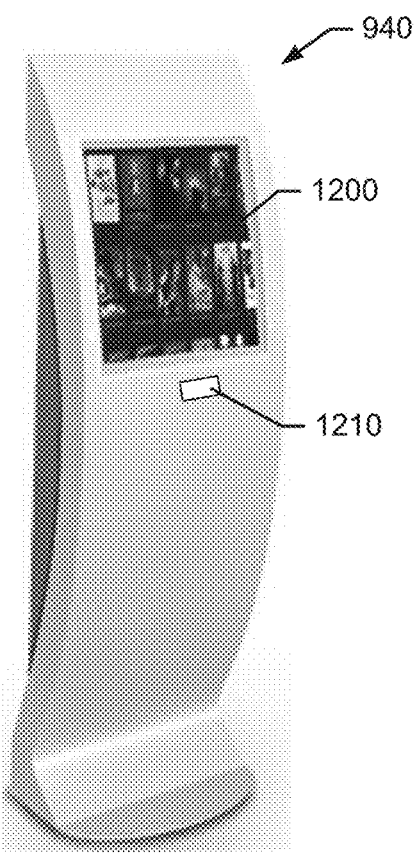
FIG. 12 illustrates a gate content loading terminal which is configured according to some embodiments.
Figure 13:
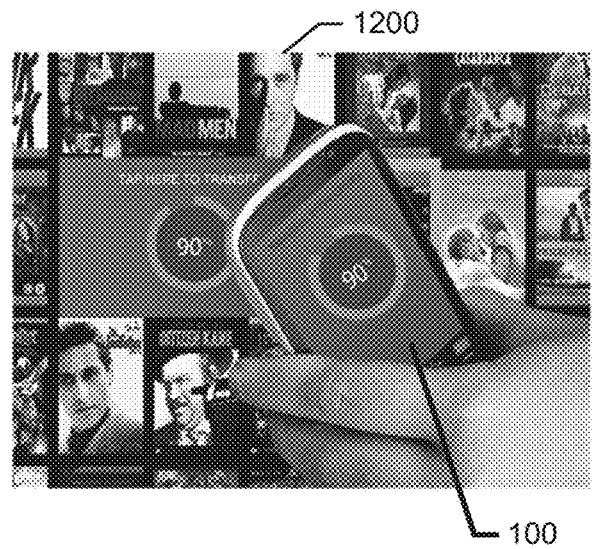
FIG. 13 illustrates operations for establishing a wireless data link and for transferring operating system software and/or entertainment content files from a gate content loading terminal to a carrier electronic device in accordance with some embodiments.
Figure 14:
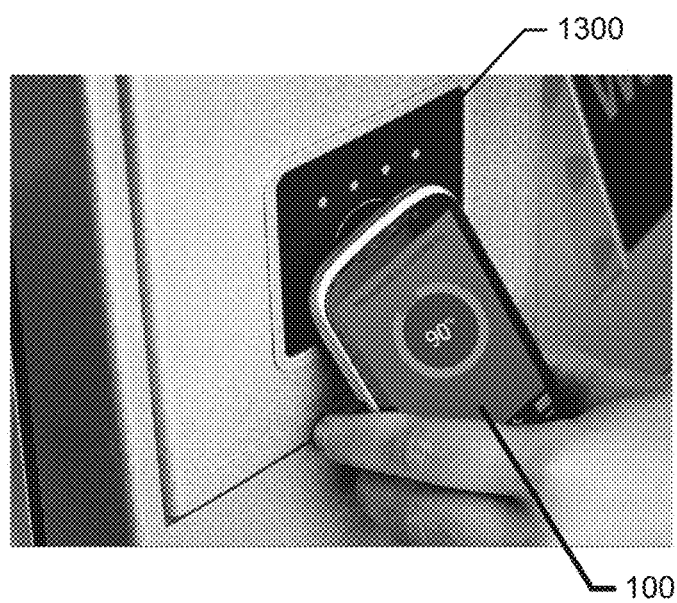
FIG. 14 illustrates other operations for establishing a wireless data link and for transferring operating system software and/or entertainment content files from a gate content loading terminal to a carrier electronic device in accordance with some embodiments.

FIG. 12 illustrates a gate content loading terminal 940 which is configured according to some embodiments. FIGS. 13 and 14 illustrate operations for establishing a wireless data link and for transferring OS software code updates and/or entertainment content files from a gate content loading terminal to a carrier electronic device 100 in accordance with some embodiments.

As shown in FIG. 12, the gate content loading terminal 940 can include a display device 1200 which is operated to display a listing of entertainment content that can be selected among by a passenger for loading onto the passenger's courier electronic device 100. Once the passenger has selected entertainment content that is to be loaded, the passenger can hold the courier electronic device 100 adjacent to a wireless transceiver 1210 of the gate loading terminal 940 to initiate wireless transfer of the file of the selected entertainment content to the mass storage device of the courier electronic device 100 via a high-bandwidth wireless data link. The gate content loading terminal 940 can also load a SVDU OS code update to the mass storage device in the courier electronic device 100 while the courier electronic device 100 is held close to the wireless transceiver 1210. The passenger may not be made aware by the gate content loading terminal 940 of the transfer of the SVDU OS code update.

In the embodiment of FIG. 13, the wireless transceiver 1210 may be located behind the display device 1200, such that the courier electronic device 100 may be used to tap-select a displayed indicia (e.g., movie advertisement picture) for one of the entertainment content files that the passenger once to transfer to the courier electronic device, and which triggers initiation of the transfer.

In the embodiment of FIG. 14, a wireless transceiver 1300 may be located elsewhere on the gate content loading terminal 940 and may operate to transfer entertainment content files and a SVDU OS code update to the courier electronic device 100 while the courier electronic device 100 is held in close proximity to the wireless transceiver 1300. The wireless transceiver 1300 may alternatively or additionally be mounted within a SVDU 190 onboard an aircraft to operate to transfer entertainment content files and a SVDU OS code update from a courier electronic device 100 to a mass storage device of the SVDU 190.

The wireless transceivers may operate according to a FastLink communication protocol, Wi-Fi communication protocol, cellular communication protocol (e.g., 4G LTE, 5G NR, etc.) and/or another wireless high bandwidth communication protocol technology. The proximity needed between the wireless transceiver and a courier electronic device 100 may therefore vary substantially depending upon the wireless communication technology that is used for the communication link.

Figure 10:
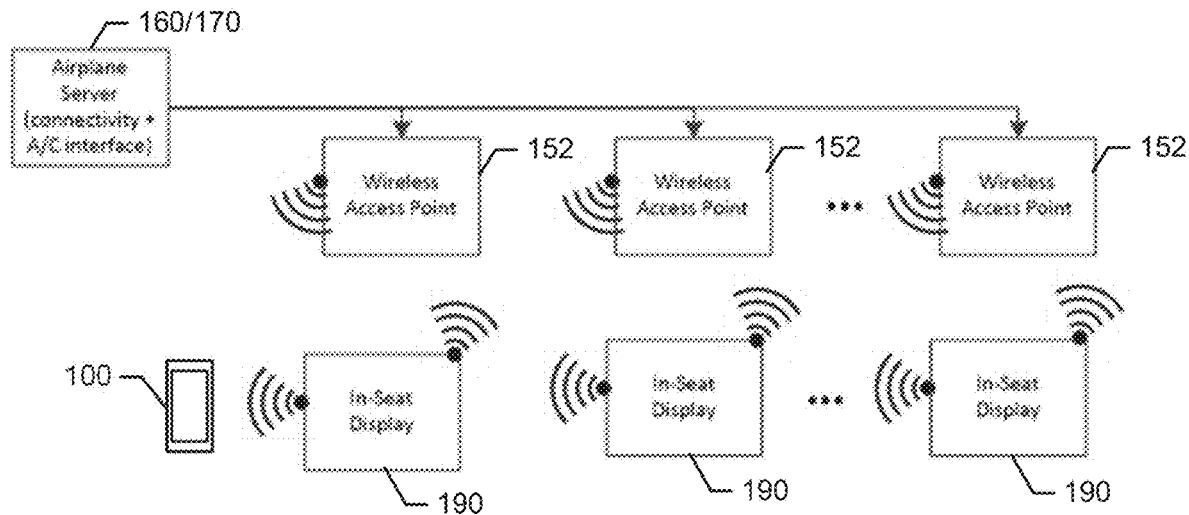
FIG. 10 is a block diagram of an aircraft-based system which is configured for updating software and entertainment content according to some embodiments.

Aircraft-Based System for SVDU Operating System Code and Entertainment Content File Distribution FIG. 10 is a block diagram of an aircraft-based system which is configured for updating SVDU OS code and entertainment content files according to some embodiments.

In the illustrated embodiment, a courier electronic device 100 can communicate through a wireless communication link with a SVDU 190 (also illustrated as an in-seat display) via a wireless communication protocol, e.g., FastLink, to upload a SVDU OS code update and/or entertainment content files to a mass storage device of the SVDU 190. The courier electronic device 100 may additionally or alternatively communicate through a wireless communication link with a wireless access point 152 via a wireless medication protocol, e.g., Wi-Fi and/or cellular communication protocol), to upload the SVDU OS code update and/or the entertainment content files through the wireless access points 152 to the mass storage device of the SVDU 190. In some embodiments, the aircraft-based system can include an airplane server 160/170 containing a mass storage device that may receive and store uploaded SVDU OS code updates and entertainment content files from courier electronic devices 100 for subsequent communication to the SVDUs 190.

Figure 11A:
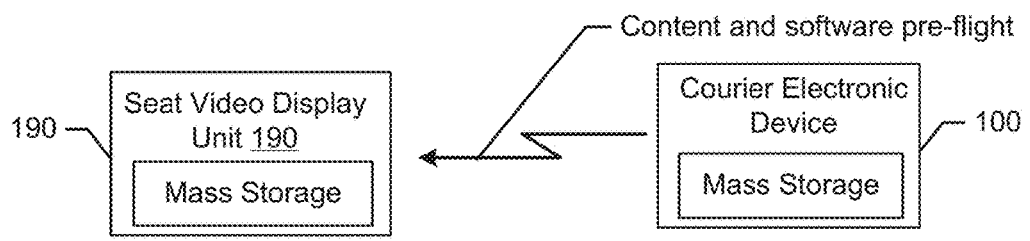
FIGS. 11a and 11b are block diagrams illustrating operations for updating content and software of a SVDU during a pre-flight phase and updating passenger content usage data during a post-flight phase, respectively, in accordance some embodiments.

FIG. 11a illustrates operations through which a courier electronic device 100 transfers entertainment content files and a SVDU OS code update from a local mass storage device through a wireless communication link to the SVDU 190 for storage in its local mass storage device.

Figure 11B:
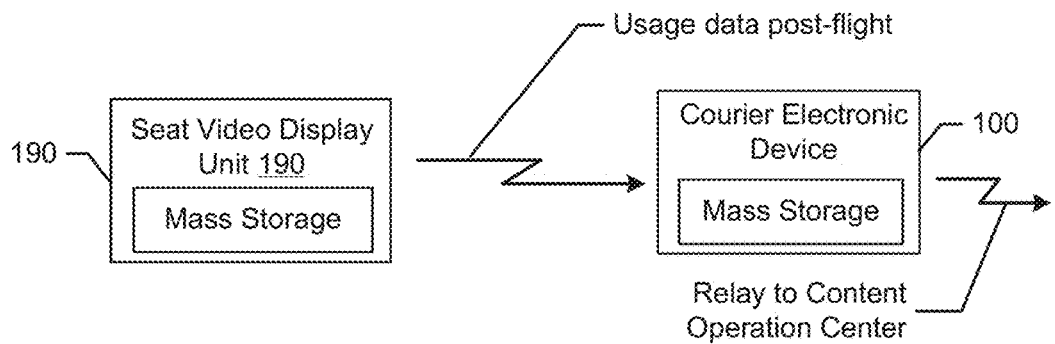

Referring to FIG. 11b, content usage data can be transferred in the opposite direction from the SVDU 190 to the courier electronic device 100, such as responsive to completion of a flight. Content usage data may be generated during a flight, such as described above, and which may be downloaded from the SVDU 190 through a wireless communication link to the courier electronic device 100. The content usage data may then be transferred from the courier electronic device 100 to the content operation center 900 through an Internet access point.

Operations for Updating SVDU Operating System Code

Figure 15:
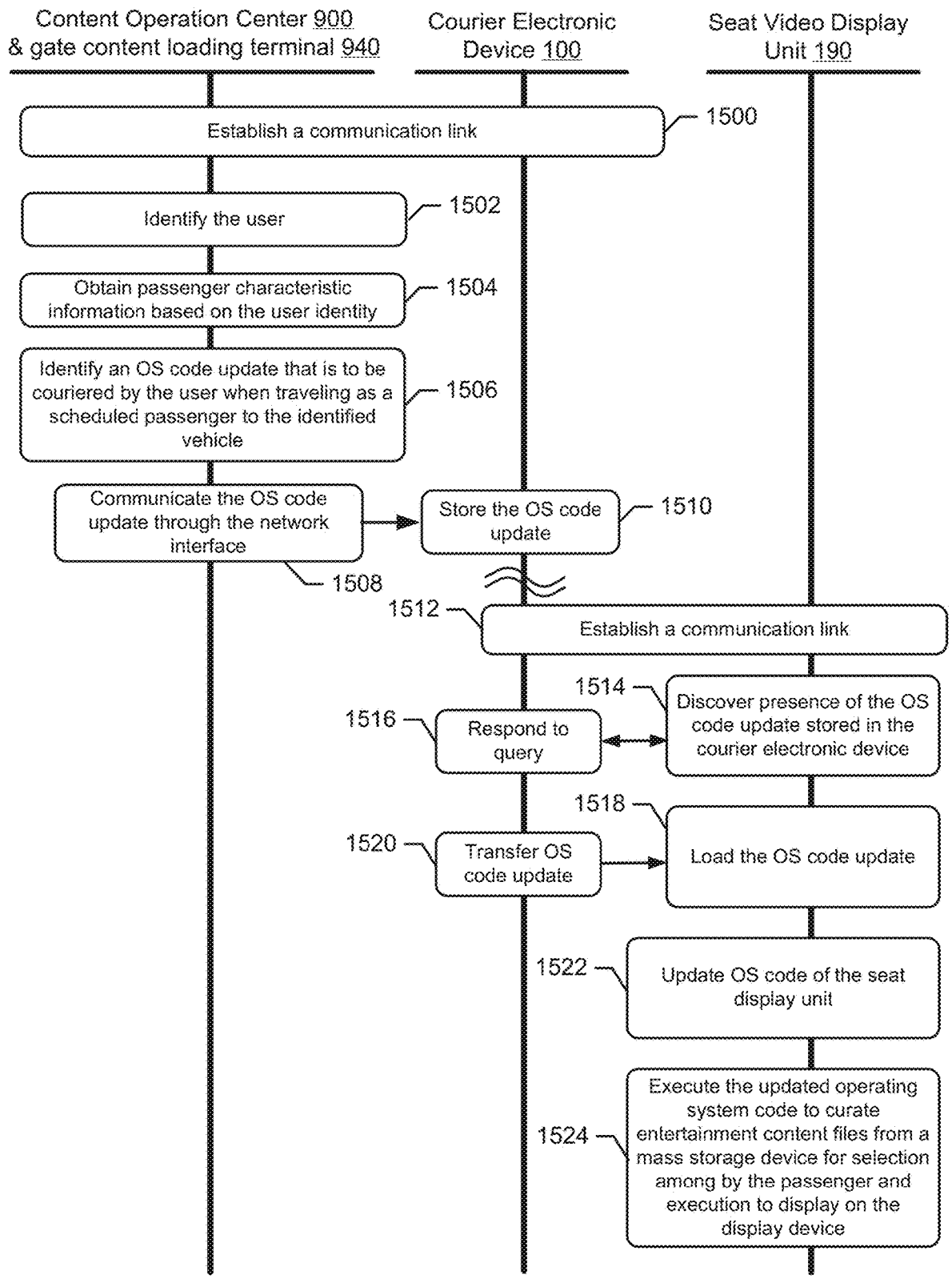
FIG. 15 illustrates a combined flowchart and data flow diagram for operations performed by a content operation center and gate content loading terminal, a courier electronic device, and a seat video display unit in accordance with some embodiments.

FIG. 15 illustrates a combined flowchart and data flow diagram for operations performed by a content operation center 900 in combination with a gate content loading terminal 940, a courier electronic device 100, and a SVDU 190 to update operating system code in the SVDU 190 in accordance with some embodiments.

Referring to FIG. 15, the content operation center 900, via the gate content loading terminal 940, establishes 1500 a communication link with a courier electronic device 100. Communications therebetween are performed to identify 1502 the user. The content operation center 900 obtains 1504, e.g. from the passenger profile repository 904, passenger characteristic information based on the user identity. The passenger characteristic information identifies a travel itinerary of the user including as a scheduled passenger on an identified airplane, and may further identify a seat assignment which can be determined to be associated with an identifiable SVDU 190. The content operation center 900 identifies 1506 a SVDU OS code update that is to be couriered by the user when traveling as the scheduled passenger to the identified vehicle. The SVDU OS code update is configured to update the OS code of the SVDU 190 which is attached to a seat on the identified aircraft.

The content operation center 900 communicates 1508 the SVDU OS code update, e.g., via the airport edge server 930 and the gate content loading terminal 940 and/or via the Internet 120 and a wireless access point, for storage on the courier electronic device 100 which is to be transported onto the vehicle by the user for updating of the OS code of the SVDU 190.

The courier electronic device 100 receives and stores 1510 the OS code update in a local mass storage device (e.g., flash memory). The courier electronic device 100 is subsequently carried onboard the aircraft by a passenger who becomes seated in the assigned seat. The passenger may tap the courier electronic device 100 against the wireless network transceiver 1300 to initiate establishment 1512 a communication link with the SVDU 190. Depending upon the wireless communication protocol that is used for the communication link, the wireless network transceivers of the courier electronic device 100 and the SVDU 190 may be configured to discover each other's presence by other protocol mechanisms.

The SVDU 190 discovers 1514 presence of the SVDU OS code update that is stored in memory of the courier electronic device 100, based on communications that are performed through the communication link there between. The communications may include a query-response protocol whereby the SVDU 190 sends a query message to the courier electronic device 100 requesting a listing of content, and the courier electronic device 100 communicates 1516 a response message to the SVDU 190. The SVDU 190 loads 1518 the SVDU OS code update from the courier electronic device 100 through the communication link, responsive to the discovering. An agent on the courier electronic device 100 operates to transfer 1520 the OS code update from the local mass storage device.

The SVDU 190 updates its present operating system code to generate updated operating system code responsive to the SVDU OS code update that was loaded from the courier electronic device 100. The SVDU 190 then executes the updated OS code to curate entertainment content files from a mass storage device that may be within the SVDU 190 and/or within the networked airplane server 160 (when present) for selection among by the passenger and for execution to display content on the display device of the SVDU 190, operations of which may be performed in a conventional manner.

The operation to update 1522 the SVDU OS code can include attempting to validate the OS code update that was loaded from the courier electronic device 100, and then replacing the OS code with the updated operating system code only if the OS code update that was loaded from the courier electronic device 100 is successfully validated. The operation to attempt to validate the OS code update can include decrypting the OS code update from an encrypted copy of the OS code update that was loaded from the courier electronic device 100, using an encryption key. The OS code update can then be validated based on whether the encrypted copy of the operating system code update is properly decrypted using the encryption key.

In one embodiment, the encryption key was earlier loaded from another courier electronic device into the program memory. Accordingly the courier electronic device may carry an encryption key that will be used to decrypt an encrypted OS code update which is later obtained from one or more later connected courier electronic devices. For example, an encryption key may be loaded from one or more courier electronic devices that were connected during flights on the aircraft during a previous week or other previous time frame, and which are designated for use in presently decrypting encrypted OS code updates that are now received from one or more courier electronic devices. Alternatively, the encryption key may also be loaded from the SVDU 190 but protected through other mechanisms, such as by a program agent that requires a valid key from the SVDU 190 in order to provide the encryption key that is to be used two decrypt the presently loaded encrypted OS code update.

Operations for Transferring New Entertainment Content Files

Figure 16A:
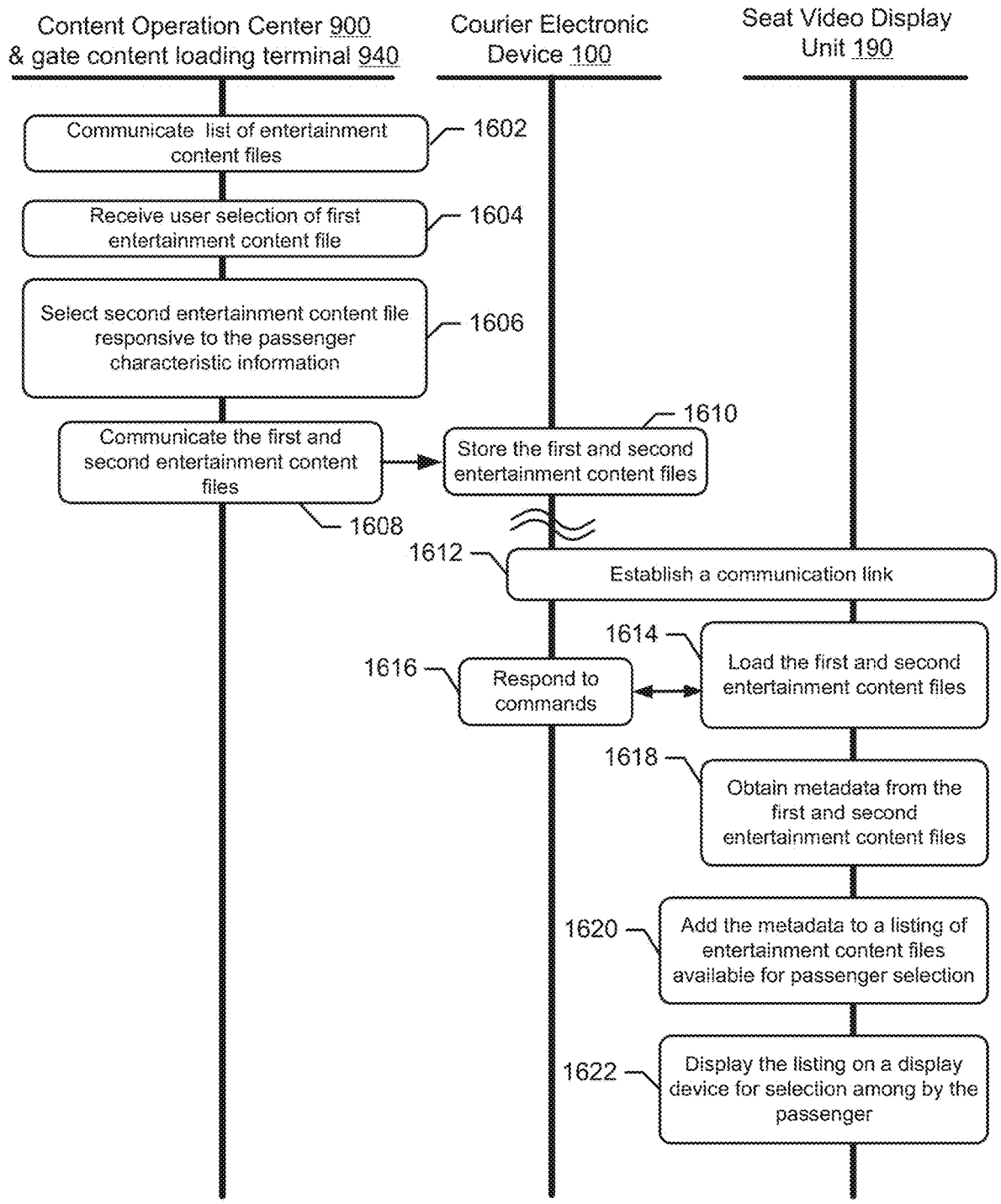
FIGS. 16A and 16B illustrate a combined flowchart and data flow diagram for some other operations performed by a content operation center and gate content loading terminal, a courier electronic device, and a seat video display unit in accordance with some embodiments.
Figure 16B:
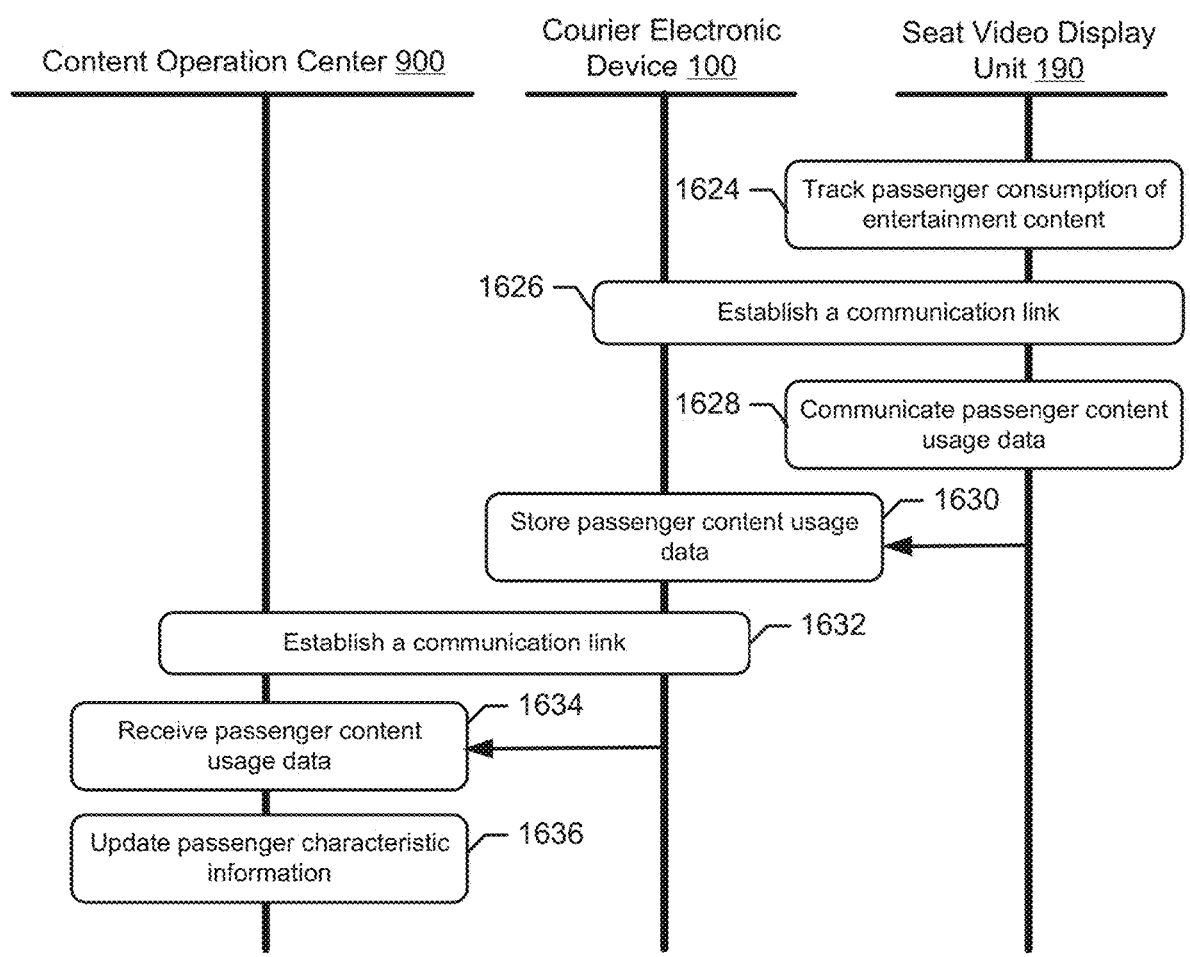

FIGS. 16A and 16B illustrate a combined flowchart and data flow diagram for some other operations that can be performed by a content operation center 900 and networked gate content loading terminal 940, a courier electronic device 100, and a SVDU 190 in accordance with some embodiments.

Referring to FIGS. 16A and 16B, the content operation center 900 communicates 1602 a list of at least some of the entertainment content files that are stored on a mass storage device (e.g., content sources 90A, content cloud server 920, and/or airport edge server 930) for display on a display device, such as the display 1200 of the gate content loading terminal 940 and/or a display of the courier electronic device 100. The content operation center 900 receives 1604 the user's selection of at least one of the entertainment content files in the list. The content operation center also selects 1606 at least one other entertainment content file from among the entertainment content files in the list, responsive to the passenger characteristic information, which may be obtained from the passenger profile repository 904. The content operation center 900 then initiates communication 1608 to the courier electronic device 100 of the at least one of the entertainment content files that was selected by the user and the at least one other entertainment content file that was selected by the content operations center responsive to the passenger characteristic information.

As explained above, the mass storage device may include the airport edge server 930 that is communicatively connected to the content operation center 900. The operations to initiate communication to the courier electronic device 100 can include generating and sending at least one message to the airport edge server 930 commanding communication of the at least one of the entertainment content files that was selected by the user and the at least one other entertainment content file that was selected by the content operations center 900 to the courier electronic device 100 through the gate loading terminal 940 located at a terminal where the aircraft will depart with the user as a passenger.

As explained above, the entertainment content files may be split into fragments for distribution to more than one courier electronic device 100. This operation may be particularly useful when the entertainment content file is not one that was selected by the user but instead was one of the selected by the content operation center 900 based on passenger characteristic information. For example, when an entertainment content file is too large to be stored within the available memory capacity of a courier electronic device, it may be split into two or more fragments that can be loaded onto different courier electronic devices for eventual uploading to one or more SVDUs. For example, the content operation center 900 may load one fragment for a particular entertainment content file onto a courier electronic device of a passenger who is assigned to a particular seat on a particular aircraft, and then load another fragment for the particular entertainment content file onto another courier electronic device of another passenger who is assigned to the particular seat on the particular aircraft on an earlier or later scheduled flight.

The courier electronic device 100 receives and stores 1610 the first and second entertainment content files. Subsequently, after the courier electronic device 100 has been transported onto the aircraft and has become within proximate range of the wireless network transceiver of the SVDU 190, the SVDU 190 in the courier electronic device 100 establishes 1612 a wireless communication link there between. The SVDU loads 1614 a new entertainment content file from the courier electronic device 100 through the wireless communication link. As explained above, the SVDU 190 may generate commands querying the courier electronic device 100 to identify what entertainment content files are available to be loaded into initiate loading, and the courier electronic device 100 may generate responses 1616 to those commands.

The SVDU stores the new entertainment content file in its local mass storage device and/or in the airplane content server 160 (when present). The SVDU 190 obtains 1618 metadata from the new entertainment content file, and adds 1620 the metadata for the new entertainment content file to a listing of entertainment content files that are available on the mass storage device. The SVDU 190 can then display 1622 the listing of entertainment files on the display device for selection among by the passenger.

The operations to disperse fragments of an entertainment content file can include communicating 1602 a list of at least some of the entertainment content files stored on the mass storage device for display on a display device to a user (who will become a passenger). The operations receive 1604 the user's selection of at least one of the entertainment content files in the list. The operations further select 1606 another one of the entertainment content files in the list that was not selected by the user but which is to be transported to the vehicle for loading into the seat video display unit 100. The operations then determine an amount of memory space in the courier electronic device 100 that is available for use in transporting entertainment content files to the identified vehicle. Responsive to determining that the amount of memory space is less than a size of the selecting another one of the entertainment content files, the operations split the selecting another one of the entertainment content files into two fragment files each containing only part of an entirety of the another one of the entertainment content files. The operations then communicate one of the two fragments to the courier electronic device 100, and schedule the other of the two fragments for later communication to another courier electronic device 100' that is later identified as being associated with another user who is a scheduled passenger on the identified vehicle and is assigned to the seat which is attached to the SVDU 190.

When the courier electronic device 100 contains only a fragment of an entertainment content file (referred to as second entertainment content file fragment), the SVDU 190 can operate to load the second entertainment content file fragment from the courier electronic device 100 through the wireless communication link, and can store the second entertainment content file fragment in the mass storage device. The SVDU 190 can then combine the second entertainment content file fragment with a first entertainment content file fragment that was earlier loaded from another courier electronic device 100' through another wireless communication link on an earlier trip by the aircraft, to generate a new entertainment content file. The SVDU 190 can obtain metadata from the new entertainment content file, and can add the metadata for the new entertainment content file to an updated listing of entertainment content files that are available on the mass storage device. The SVDU 190 can then display the updated listing of entertainment files on the display device for selection among by the passenger.

Operations for Tracking and Transferring Passenger Content Usage Data

As explained above, the SVDU 190 and/or another component of the IFE system can operate to track passenger usage of the entertainment content, such as by tracking which movies, television shows, and/or application programs are viewed or executed by the passenger, tracking how long the content was viewed and/or what percentage of the content was consumed. Other characteristics of the passenger may alternatively or additionally be tracked, such as the amount of time that the passengers interacting with the SVDU 190, and/or other interactions that can be tracked or passenger activity that can be sensed.

With further reference to the illustrated embodiment of FIG. 16B, the SVDU 190 can track 1624 which entertainment content from the mass storage device is selected by the passenger for consumption through the display device while the vehicle is traveling, and/or other characteristics as described above. The SVDU 190 generates passenger content usage data based on the tracking. The content operation center 900 may have earlier communicated a message containing passenger characteristic information to the courier electronic device 100 for storage. The SVDU 190 may then load the passenger characteristic information from the courier electronic device 100, which may identify the passenger, demographic information characterizing the passenger, passenger flight history, content viewing preferences of the passenger, a historical log of what content the passenger has viewed on an earlier segment of the present flight schedule or on earlier completed flights, content viewing preferences that may have been defined by the passenger or learned through other information repositories such as social media accounts of the passenger, etc. The passenger content usage data may therefore include an identifier for the passenger.

If the communication link between the courier electronic device 100 and the SVDU 190 that was used to load entertainment content has since been terminated, the SVDU 190 can operate to establish 1626 a communication link with the courier electronic device 100. The SVDU 190 then communicates 1628 the passenger content usage data through the communication link to the courier electronic device 100, which operates to store 1630 the passenger content usage data in a local memory thereof.

After the passenger has departed the aircraft, the courier electronic device establishes 1632 a communication link with the content operation center 900, such as through an Internet access point (e.g., WiFi access point, cellular transceiver base station, etc.), and communicates the passenger content usage data for receipt 1634 by the content operation center 900. The content operation center 900 then uses the passenger content usage data to update 1636 the passenger characteristic information, which may be stored in the passenger profile repository 904.

Operations for Controlling a Graphical User Interface Provided by a SVDU Based on Passenger Characteristic Information The content operation center 900 may customize the look and/or operation of a graphical user interface (GUI) provided by a SVDU 190 based on passenger characteristic information that may be obtained from the passenger profile repository 904 and/or from another system element.

Figure 17:
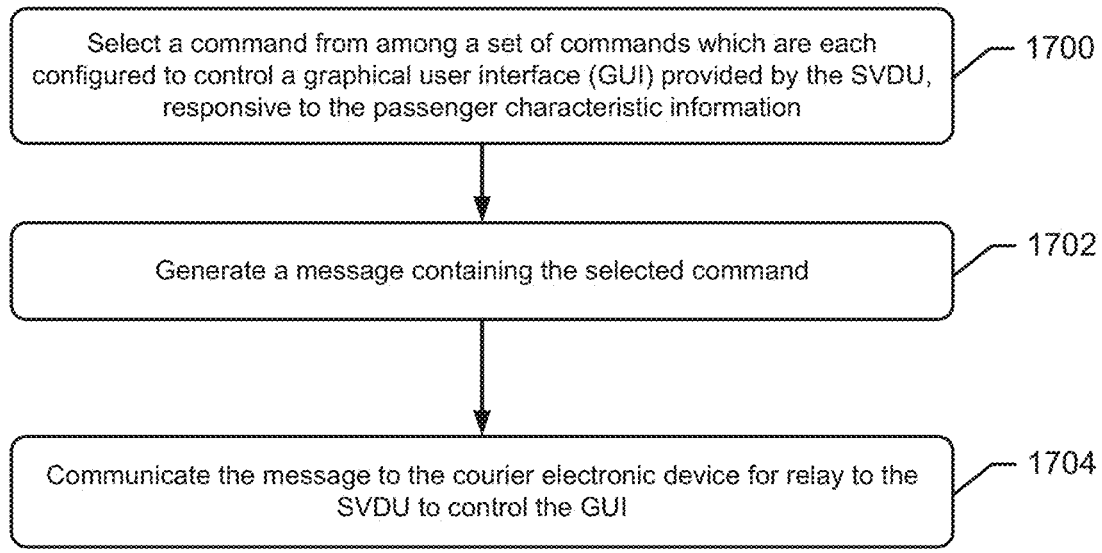
FIG. 17 illustrates a flowchart of operations that may be performed by a content operation center to control a graphical user interface that is provided by a SVDU based on passenger characteristic information.

FIG. 17 illustrates a flowchart of operations that may be performed by the content operation center 900 to control the GUI provided by the SVDU 190. Referring to FIG. 17, the operations selects 1700 a command from among a set of commands which are each configured to control a GUI provided through a display device of the SVDU 190, responsive to the passenger characteristic information. The operations generate 1702 a message containing the selected command, and communicate 1704 the message through the wireless communication link to the courier electronic device 100 for relay to the SVDU 190 to control the GUI provided through the display device. The SVDU 190 can load the command from the courier electronic device 100 and operate to control its GUI responsive thereto.

For example, the command may influence a location and size of user selectable elements of the GUI that are displayed on the display device of the SVDU 190. Alternatively or additionally, the command may influence selection of a starting GUI level from among a hierarchical set of GUI levels responsive to the passenger characteristic information, where each of the GUI levels defines a GUI screen having user selectable elements and information to be displayed through the display device to the passenger. Still alternatively or additionally, the command may influence selection of a hierarchical set of GUI levels from among a plurality of hierarchical sets of GUI levels responsive to the passenger characteristic information, where each of the hierarchical sets of GUI levels have a different set of GUI levels, and each of the GUI levels defines a GUI screen having user selectable elements and information to be displayed through the display device to the passenger.

The operations to select the command from among the set of commands may include determining location and size of user selectable elements of the GUI that are to be displayed on the display device responsive to the passenger characteristic information. The operations then select the command from among the set of commands based on the determined location and size of user selectable elements of the GUI.

Alternatively or additionally, the operations to select a command from among the set of commands may include selecting a starting GUI level from among a hierarchical set of GUI levels responsive to the passenger characteristic information. Each of the GUI levels defines a GUI screen having user selectable elements and information to be displayed through the display device of the seat video display unit to the passenger. The operations then select the command from among the set of commands based on the selected starting GUI level.

As explained above, the content operation center 900 may have earlier communicated a message containing passenger characteristic information to the courier electronic device 100 for storage. The SVDU 190 may then load the passenger characteristic information from the courier electronic device 100, which may identify the passenger, demographic information characterizing the passenger, passenger flight history, content viewing preferences of the passenger, a historical log of what content the passenger has viewed on an earlier segment of the present flight schedule or on earlier completed flights, content viewing preferences that may have been defined by the passenger or learned through other information repositories such as social media accounts of the passenger, etc.

Figure 18:
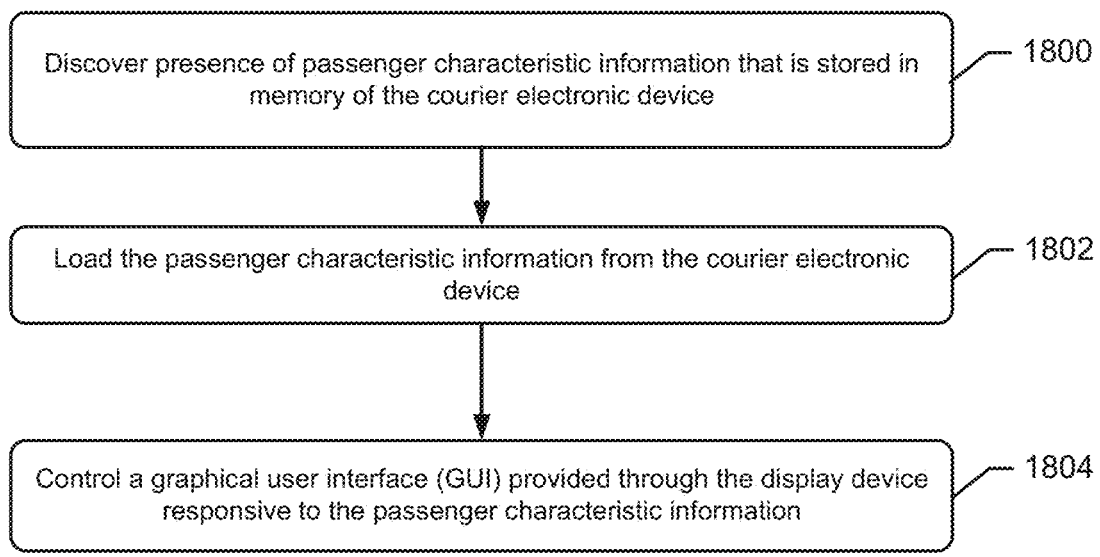
FIG. 18 illustrates a flowchart of operations that may be performed by a SVDU to control a graphical user interface based on passenger characteristic information that is loaded from a courier electronic device 100.

FIG. 18 illustrates a flowchart of corresponding operations that may be performed by the SVDU 190 to control a graphical user interface based on the passenger characteristic information that is loaded from the courier electronic device 100.

The operations include discovering 1800 presence of passenger characteristic information that is stored in memory of the courier electronic device 100, based on communications performed through the communication link. The operations load 1802 the passenger characteristic information from the courier electronic device 100 through the communication link, responsive to the discovering. The operations then control 1804 the GUI provided through the display device of the SVDU 190 responsive to the passenger characteristic information.

In one embodiment, the operations to control the GUI include determining location and size of user selectable elements of the GUI that are to be displayed on the display device responsive to the passenger characteristic information.

In another embodiment, the operations to control the GUI include selecting a starting GUI level from among a hierarchical set of GUI levels responsive to the passenger characteristic information, where each of the GUI levels defines a GUI screen having user selectable elements and information to be displayed through the display device to the passenger. The operations display on the display device the user selectable elements and information of the GUI screen defined by the starting GUI level, before displaying another GUI screen that is defined by another one GUI levels of the hierarchical set of GUI levels.

In another embodiment, the operations to control the GUI include selecting a hierarchical set of GUI levels from among a plurality of hierarchical sets of GUI levels responsive to the passenger characteristic information, where each of the hierarchical sets of GUI levels have a different set of GUI levels, and each of the GUI levels defines a GUI screen having user selectable elements and information to be displayed through the display device to the passenger. The operations control the GUI provided through the display device to only display GUI screens that are defined by one of the GUI levels within the selected hierarchical set of GUI levels.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A content operations center comprising:
at least one network interface connected to a mass storage device storing entertainment content files and to a repository of passenger profiles;
at least one processor connected to the at least one network interface;
a program memory device storing program code that is executed by the at least one processor to perform operations comprising:
  identifying users;
  for each of the users, obtaining passenger characteristic information based on the identity of the user, wherein the passenger characteristic information identifies a travel itinerary of the user including as a scheduled passenger on an identified vehicle;
  identifying an operating system code update that is to be couriered by users when traveling as scheduled passengers on the identified vehicle, wherein the operating system code update is configured to update an operating system code of seat video display units attached to seats on the identified vehicle;
  dividing the operating system code update into operating system code update fragments, wherein the operating system code update fragments collectively contain all data necessary for reassembling the operating system code update; and
  distributing the operating system code update fragments through the network interface for storage on courier electronic devices which are to be transported onto the vehicle by the users for updating of the operating system code of the seat video display unit, wherein the distributing is performed so that the courier electronic devices are distributed one of the operating system code update fragments containing data that is at least partially redundant with data contained in one of the operating system code update fragments that is distributed to at least one other one of the courier electronic devices and that is not redundant to data contained in other ones of the operating system code update fragments that are distributed to still other ones of the courier electronic devices.

2. The content operations center of claim 1, wherein the operations further comprise:
communicating through the at least one network interface for display, a list of at least some of the entertainment content files stored on the mass storage device;
receiving a user's selection of at least one of the entertainment content files in the list;
selecting at least one other entertainment content file from among the entertainment content files in the list, responsive to the passenger characteristic information; and
initiating communication to the courier electronic device of the user at least one of the entertainment content files that was selected by the user and the at least one other entertainment content file that was selected by the content operations center responsive to the passenger characteristic information, which is to be transported onto the vehicle by the user for transfer entertainment content files from the courier electronic device to the seat video display unit.

3. The content operations center of claim 2, wherein:
the mass storage device comprises an airport edge server that is communicatively connected to the at least one processor via the at least one network interface; and the operations to initiate communication to the courier electronic device of the at least one of the entertainment content files that was selected by the user and the at least one other entertainment content file that was selected by the content operations center responsive to the passenger characteristic information, comprise:

generating and sending at least one message to the airport edge server commanding communication of the at least one of the entertainment content files that was selected by the user and the at least one other entertainment content file that was selected by the content operations center to the courier electronic device through a gate loading terminal located at a terminal where the vehicle will depart with the user as a passenger.

4. The content operations center of claim 1, wherein the operations further comprise:

communicating through the at least one network interface for display, a list of at least some of the entertainment content files stored on the mass storage device;

receiving a user's selection of at least one of the entertainment content files in the list;

selecting another one of the entertainment content files in the list that was not selected by the user but which is to be transported to the vehicle for loading into the seat video display unit;

determining an amount of memory space in the courier electronic device of the user that is available for use in transporting entertainment content files to the identified vehicle;

responsive to determining that the amount of memory space is less than a size of the selecting another one of the entertainment content files, splitting the selecting another one of the entertainment content files into two fragment files each containing only part of an entirety of the another one of the entertainment content files, communicating one of the two fragments to the courier electronic device, and scheduling the other of the two fragments for later communication to another courier electronic device that is later identified as being associated with another user who is a scheduled passenger on the identified vehicle and is assigned to the seat which is attached to the seat video display unit.

5. The content operations center of claim 1, wherein the operations further comprise:

for each of the users,
generating a message containing the passenger characteristic information, and
communicating the message through the network interface to the courier electronic device of the user.

6. The content operations center of claim 1, wherein the operations further comprise:

selecting a command from among a set of commands which are each configured to control a graphical user interface (GUI) provided through a display device of one of the seat video display units which is to be used by a user, responsive to the passenger characteristic information of the user;

generating a message containing the selected command; and communicating the message through the network interface to the courier electronic device of the user for relay to the one of the seat video display units to control the GUI provided through the display device.

7. The content operations center of claim 6, wherein the operations to select the command from among the set of commands which are each configured to control the GUI provided through the display device of the seat display, responsive to the passenger characteristic information, comprises:

determining location and size of user selectable elements of the GUI that are to be displayed on the display device responsive to the passenger characteristic information; and selecting the command from among the set of commands based on the determined location and size of user selectable elements of the GUI.

8. The content operations center of claim 6, wherein the operations to select the command from among the set of commands which are each configured to control the GUI provided through the display device of the seat display, responsive to the passenger characteristic information, comprises:

selecting a starting GUI level from among a hierarchical set of GUI levels responsive to the passenger characteristic information, wherein each of the GUI levels defines a GUI screen having user selectable elements and information to be displayed through the display device of the seat video display unit to the passenger; and selecting the command from among the set of commands based on the selected starting GUI level.

9. The content operations center of claim 6, wherein the operations to select the command from among the set of commands which are each configured to control the GUI provided through the display device of the seat display, responsive to the passenger characteristic information, comprises:

selecting a hierarchical set of GUI levels from among a plurality of hierarchical sets of GUI levels responsive to the passenger characteristic information, wherein each of the hierarchical sets of GUI levels have a different set of GUI levels, and each of the GUI levels defines a GUI screen having user selectable elements and information to be displayed through the display device to the passenger; and selecting the command from among the set of commands based on the selected hierarchical set of GUI levels.

10. The content operations center of claim 1, wherein the operations further comprise:

receiving from one of the courier electronic device following a trip by the vehicle, a message containing entertainment usage data; and updating the passenger characteristic information for a user associated with the one of the courier electronic devices, based on the entertainment usage data.

11. The content operations center of claim 1, wherein the passenger characteristic information further identifies a seat assignment for the identified user on the identified vehicle.

12. The content operations center of claim 11, wherein the operations further comprise:

determining a seat video display unit associated with the identified seat assignment for the identified user on the identified vehicle.

13. The content operations center of claim 12, wherein the identifying an operating system code update that is to be couriered by the user when traveling as the scheduled passenger to the identified vehicle, comprises:

selecting, by the content operations center, an operating system code update to be delivered to an identified seat video display unit based on the passenger characteristic information identifying a seat assignment and the determined seat video display unit associated with the seat assignment.

14. The content operations center of claim 1, wherein the passenger characteristic information includes passenger identity information, demographic information characterizing the passenger, passenger travel history, content viewing preferences of the passenger, and/or a historical log of content the passenger has previously viewed on an earlier segment of the present travel schedule or on earlier completed travels.

15. The content operations center of claim 14, wherein the content viewing preferences of the passenger are defined by the passenger or learned through information repositories including social media accounts of the passenger.

16. The content operations center of claim 1 wherein the distributing the operating system code update fragments through the network interface and store on courier electronic devices which are to be transported onto the vehicle by users for updating of the operating system code of the seat video display unit, further comprises:

controlling an amount of the redundancy in the data of some of the operating system code update fragments distributed across the courier electronic devices, based on a number of the courier electronic devices being associated with passenger characteristic information that identifies a travel itinerary of the user as including the passenger being scheduled to travel on an identified vehicle.

17. The content operations center of claim 16, wherein the controlling an amount of the redundancy in the data of some of the operating system code update fragments distributed across the courier electronic devices, based on a number of the courier electronic devices being associated with passenger characteristic information that identifies a travel itinerary of the user as including the passenger being scheduled to travel on an identified vehicle, comprises:

decreasing the amount of redundancy based on identifying a greater number of the courier electronic devices being associated with passenger characteristic information that identifies a travel itinerary of the user as including the passenger being scheduled to travel on an identified vehicle; and increasing the amount of redundancy based on a lesser number of the courier electronic devices being associated with passenger characteristic information that identifies a travel itinerary of the user as including the passenger being scheduled to travel on an identified vehicle.

18. The content operations center of claim 17, wherein the controlling an amount of the redundancy in the data of some of the operating system code update fragments distributed across the courier electronic devices, based on a number of the courier electronic devices being associated with passenger characteristic information that identifies a travel itinerary of the user as including the passenger being scheduled to travel on an identified vehicle, further comprises:

controlling the amount of redundancy based on the use of historical statistics developed from reports of successful transfers completed in the past for operating system code update fragments transported from the content operations center to the identified vehicle using courier electronic devices being associated with passenger characteristic information that identifies a travel itinerary of the user as including the passenger being scheduled to travel on an identified vehicle.

19. The content operations center of claim 1, wherein the distributing the operating system code update fragments through the network interface and store on courier electronic devices which are to be transported onto the vehicle by users for updating of the operating system code of the seat video display unit, further comprises:

tracking proximity of the courier electronic device relative to a departure location and time of the identified vehicle;

predicting a probability of various of the operating system code update fragments being carried onto the vehicle based on the tracked proximity; and controlling the distribution of the operating system code update fragments based on the predicted probability of various of the operating system code update fragments being carried onto the identified vehicle.

\* \* \* \* \*